US012580003B1

(12) United States Patent
Xing et al.

(10) Patent No.: US 12,580,003 B1
(45) Date of Patent: Mar. 17, 2026

(54) DETERMINING TOPIC CHAPTERS FOR DIGITAL VIDEOS UTILIZING A SLIDING WINDOW AND VIDEO SEGMENTATION MACHINE LEARNING MODELS

(71) Applicant: Adobe Inc., San Jose, CA (US)

(72) Inventors: Linzi Xing, Vancouver (CA); Franck Dernoncourt, Seattle, WA (US); Fabian David Caba Heilbron, Campbell, CA (US); Seunghyun Yoon, Seoul (KR); Zhaowen Wang, San Jose, CA (US); Trung Bui, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/960,500

(22) Filed: Nov. 26, 2024

(51) Int. Cl.
| | |
|---|---|
| *G11B 27/19* | (2006.01) |
| *G06F 40/289* | (2020.01) |
| *G06V 20/40* | (2022.01) |

(52) U.S. Cl.
CPC ............ *G11B 27/19* (2013.01); *G06F 40/289* (2020.01); *G06V 20/41* (2022.01); *G06V 20/49* (2022.01)

(58) Field of Classification Search
CPC ....... G11B 27/19; G06F 40/289; G06V 20/49; G06V 20/41
See application file for complete search history.

(56) References Cited

U.S. PATENT DOCUMENTS

| | | | |
|---|---|---|---|
| 2008/0066136 A1* | 3/2008 | Dorai ................... | G06F 16/7834 |
| | | | 725/135 |
| 2024/0428799 A1* | 12/2024 | Kaliannan Neelamohan .............. | |
| | | | G10L 17/02 |
| 2025/0006226 A1* | 1/2025 | Aneja .................... | H04N 5/278 |

(Continued)

OTHER PUBLICATIONS

Alam, T., Khan, A., Alam, F.: "Punctuation Restoration using Transformer Models for High-and Low-Resource Languages". In: Proceedings of the Sixth Workshop on Noisy User-generated Text (W-NUT 2020). pp. 132-142 (2020).

(Continued)

*Primary Examiner* — Thai Q Tran
*Assistant Examiner* — Jose M Mesa
(74) *Attorney, Agent, or Firm* — Keller Preece PLLC

(57) ABSTRACT

The present disclosure relates to systems, non-transitory computer-readable media, and methods for segmenting digital videos into topic chapters utilizing a sliding window and video segmentation models. Specifically, the disclosed systems utilize a sliding window to divide a digital video into overlapping segments, each segment including a subset of sentences of a transcript of the video and corresponding video frames for a given time window of the digital video. Further, the disclosed systems generate, for each overlapping segment, topic-boundary label predictions for the subset of sentences. Specifically, the disclosed systems generate text representations for the sentences using a text encoder and frame representations for the corresponding video frames using a frame encoder. Moreover, the disclosed (Continued)

800 —⟋

Utilizing A Sliding Window To Divide A Digital Video Into Overlapping Video Segments *802*

Determining A Subset Of Sentences Of A Transcript Of The Video For Each Video Segment *804*

Determining A Subset Of Video Frames Corresponding To Each Sentence Of Each Segment *806*

Generating A Plurality Of Topic-Boundary Label Predictions For Each Sentence Of Each Video Segment *808*

Generating A Topic-Boundary Label For Each Sentence Of The Transcript Based On The Topic-Boundary Label Predictions Of The Sentences Of The Video Segments *810* systems generate the topic-boundary label predictions based on the text representations and the frame representations. Additionally, the disclosed systems generate a topic-boundary label for each sentence of the transcript based on the topic-boundary label predictions.

20 Claims, 12 Drawing Sheets

(56) References Cited

U.S. PATENT DOCUMENTS

2025/0278853 A1* 9/2025 Zhao ..................... G06V 20/49

OTHER PUBLICATIONS

Baraldi, L., Grana, C., Cucchiara, R.: "A Deep Siamese Network for Scene Detection in Broadcast Videos". In: Proceedings of ACM MM 2015. pp. 1199-1202 (2015).
Beeferman, D., Berger, A., Lafferty, J.: "Statistical Models for Text Segmentation". Machine Learning 34(1), 177-210 (1999).
Cao, X., Chen, Z., Le, C., Meng, L.: "Multi-modal Video Chapter Generation". ArXiv abs/2209.12694 (2022).
Chen, D., Wang, D., Darrell, T., Ebrahimi, S.: Contrastive test-time adaptation. In: Proceedings of CVPR 2022. pp. 295-305 (2022).
Chen, S., Nie, X., Fan, D.D., Zhang, D., Bhat, V., Hamid, R.: "Shot Contrastive Self-Supervised Learning for Scene Boundary Detection". In: Proceedings of CVPR 2021. pp. 9791-9800 (2021).
Devlin, J., Chang, M.W., Lee, K., Toutanova, K.: "BERT: Pre-training of Deep Bidirectional Transformers for Language Understanding". In: Proceedings of NAACL 2019. pp. 4171-4186. Association for Computational Linguistics (2019).
Eisenstein, J., Barzilay, R.: "Bayesian Unsupervised Topic Segmentation". In: Proceedings of EMNLP 2008. pp. 334-343 (2008).
Fraser, C., Kim, J., Shin, H., Brandt, J., Dontcheva, M.: "Temporal Segmentation of Creative Live Streams". In: Proceedings of CHI 2020. pp. 1-12 (2020).
Georgescul, M., Clark, A., Armstrong, S.: "An Analysis of Quantitative Aspects in the Evaluation of Thematic Segmentation Algorithms". In: Proceedings of SIGdial 2006. pp. 144-151 (2006).
Glavaš, G., Nanni, F., Ponzetto, S.P.: "Unsupervised Text Segmentation Using Semantic Relatedness Graphs". In: Proceedings of the Fifth Joint Conference on Lexical and Computational Semantics. pp. 125-130 (2016).
Glavaš, G., Somasundaran, S.: "Two-Level Transformer and Auxiliary Coherence Modeling for Improved Text Segmentation". In: Proceeding of AAAI-20. pp. 2306-2315 (2020).
Gygli, M., Grabner, H., Riemenschneider, H., Van Gool, L.: "Creating Summaries from user Videos". In: Proceedings of ECCV 2014. pp. 505-520 (2014).
He, K., Zhang, X., Ren, S., Sun, J.: "Deep Residual Learning for Image Recognition". In: Proceedings of CVPR 2016. pp. 770-778 (2016).
Hearst, M.A.: "TextTiling: Segmenting Text into Multi-Paragraph Subtopic Passages". Computational Linguistics 23(1), 33-64 (1997).
Jadon, S., Jasim, M.: "Unsupervised Video Summarization Framework Using Keyframe Extraction and Video Skimming". In: Proceedings of ICCCA 2020. pp. 140-145 (2020).
James, N., Todorov, K., Hudelot, C.: "Combining Visual and Textual Modalities for Multimedia Ontology Matching". In: Semantic Multimedia. pp. 95-110 (2011).
Jayaraman, D., Grauman, K.: "Slow and Steady Feature Analysis: Higher Order Temporal Coherence in Video". In: Proceeding of CVPR 2016. pp. 3852-3861 (2016).
Kang, G., Jiang, L., Yang, Y., Hauptmann, A.G.: "Contrastive Adaptation Network for Unsupervised Domain Adaptation". In: Proceedings of CVPR 2019. pp. 4893-4902 (2019).

Kim, D., Tsai, Y.H., Zhuang, B., Yu, X., Sclaroff, S., Saenko, K., Chandraker, M .: "Learning Cross-Modal Contrastive Features for Video Domain Adaptation". In: Proceedings of ICCV 2021. pp. 13618-13627 (2021).
Koshorek, O., Cohen, A., Mor, N., Rotman, M., Berant, J.: "Text Segmentation as a Supervised Learning Task". In: Proceedings of NAACL 2018. pp. 469-473 (2018).
Kumar, A., Mittal, T., Manocha, D.: "MCQA: Multimodal Co-attention Based Network for Question Answering". CoRR abs/2004. 12238 (2020).
Li, J., Sun, A., Joty, S.: "SegBot: A Generic Neural Text Segmentation Model with Pointer Network". In: Proceedings of IJCAI-18. pp. 4166-4172 (2018).
Lo, K., Jin, Y., Tan, W., Liu, M., Du, L., Buntine, W.: "Transformer over Pre-Trained Transformer for Neural Text Segmentation with Enhanced Topic Coherence". In: EMNLP 2021 (Findings). pp. 3334-3340 (2021).
Lu, J., Yang, J., Batra, D., Parikh, D.: "Hierarchical Question-Image Co-Attention for Visual Question Answering". In: Proceedings of NeurIPS 2016. pp. 289-297 (2016).
Lukasik, M., Dadachev, B., Papineni, K., Simões, G.: "Text Segmentation by Cross Segment Attention". In: Proceedings of EMNLP 2020. pp. 4707-4716 (2020).
Qiu, J., Zhu, J., Xu, M., Dernoncourt, F., Bui, T., Wang, Z., Li, B., Zhao, D., Jin, H.: "Semantics-Consistent Cross-domain Summarization via Optimal Transport Alignment". ArXiv abs/2210.04722 (2022).
Radford, A., Kim, J.W., Xu, T., Brockman, G., McLeavey, C., Sutskever, I.: "Robust Speech Recognition via Large-Scale Weak Supervision". ArXiv abs/2212.04356 (2022).
Rao, A., Xu, L., Xiong, Y., Xu, G., Huang, Q., Zhou, B., Lin, D.: "A Local-to-Global Approach to Multi-modal Movie Scene Segmentation". In: Proceedings of CVPR 2020. pp. 10146-10155 (2020).
Rasheed, Z., Shah, M.: "Scene Detection in Hollywood Movies and TV Shows". In: Proceedings of CVPR 2003. pp. II-343 (2003).
Rui, Y., Huang, T.S., Mehrotra, S.: "Exploring Video Structure Beyond the Shots". In: Proceedings of the IEEE International Conference on Multimedia Computing and Systems. pp. 237-240 (1998).
Song, Y., Vallmitjana, J., Stent, A., Jaimes, A.: TVSum: Summarizing Web Videos Using Titles. In: Proceeding of CVPR 2015. pp. 5179-5187 (2015).
Souek, T., Lokoč, J.: "TransNet V2: An Effective Deep Network Architecture for Fast Shot Transition Detection". ArXiv abs/2008. 04838 (2020).
Van den Oord, A., Li, Y., Vinyals, O.: "Representation Learning with Contrastive Predictive Coding". ArXiv abs/1807.03748 (2018).
Vaswani, A., Shazeer, N., Parmar, N., Uszkoreit, J., Jones, L., Gomez, A.N., Kaiser, L.u., Polosukhin, I.: "Attention Is All You Need". In: Advances in Neural Information Processing Systems. vol. 30 (2017).
Wang, Z., Zhong, Y., Miao, Y., Ma, L., Specia, L.: "Contrastive Video-Language Learning with Fine-grained Frame Sampling". In: Proceedings of AACL-IJCNLP 2022. pp. 694-705 (2022).
Xiao, S., Chen, L., Zhang, S., Ji, W., Shao, J., Ye, L., Xiao, J.: "Boundary Proposal Network for Two-Stage Natural Language Video Localization". In: Proceedings of AAAI- 21, pp. 2986-2994, (2021).
Xing, L., Carenini, G.: "Improving Unsupervised Dialogue Topic Segmentation with Utterance-Pair Coherence Scoring". In: Proceedings of SIGdial 2021. pp. 167-177 (2021).
Xing, L., Hackinen, B., Carenini, G., Trebbi, F.: "Improving Context Modeling in Neural Topic Segmentation". In: Proceedings of AACL-IJCNLP 2020. pp. 626-636 (2020).
Xing, L., Huber, P., Carenini, G.: "Improving Topic Segmentation by Injecting Discourse Dependencies". In: Proceedings of the 3rd Workshop on Computational Approaches to Discourse. pp. 7-18 (2022).
Zhu, W., Pang, B., Thapliyal, A.V., Wang, W.Y., Soricut, R.: "End-to-end Dense Video Captioning as Sequence Generation". In: Proceedings of COLING 2022. pp. 5651-5665 (2022).

* cited by examiner

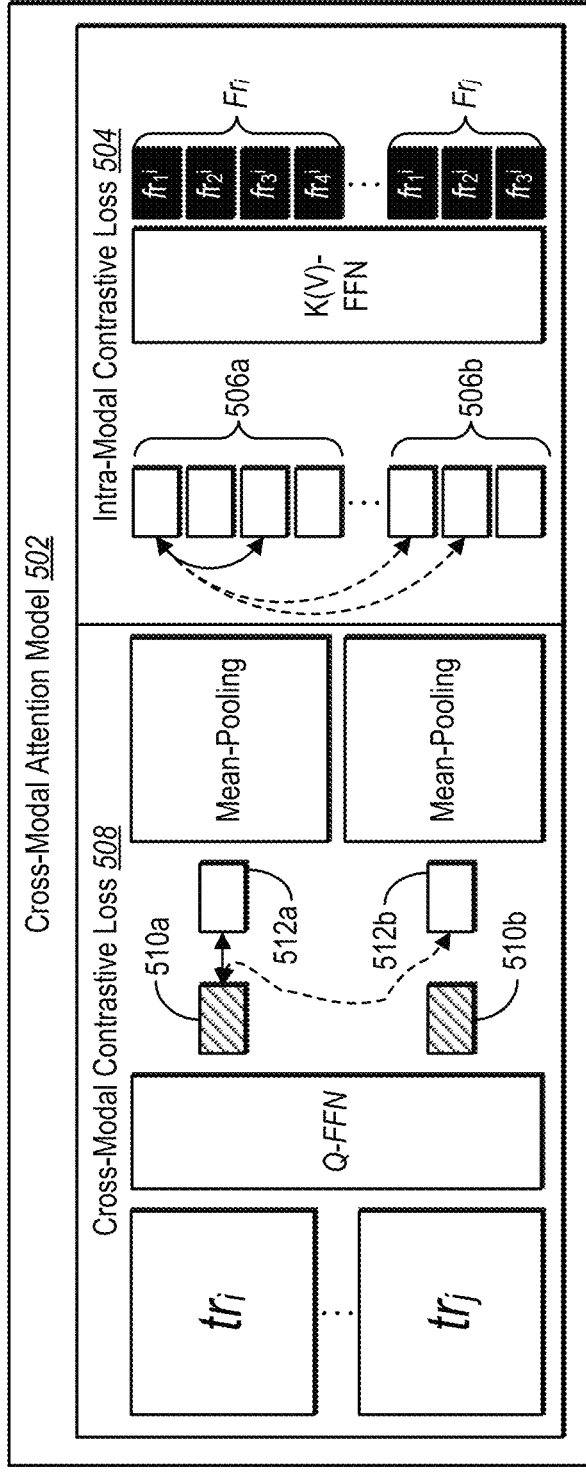
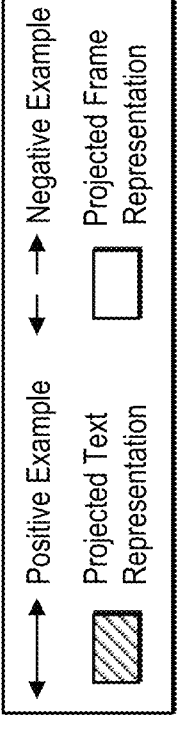
*Fig. 5*

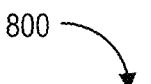

800

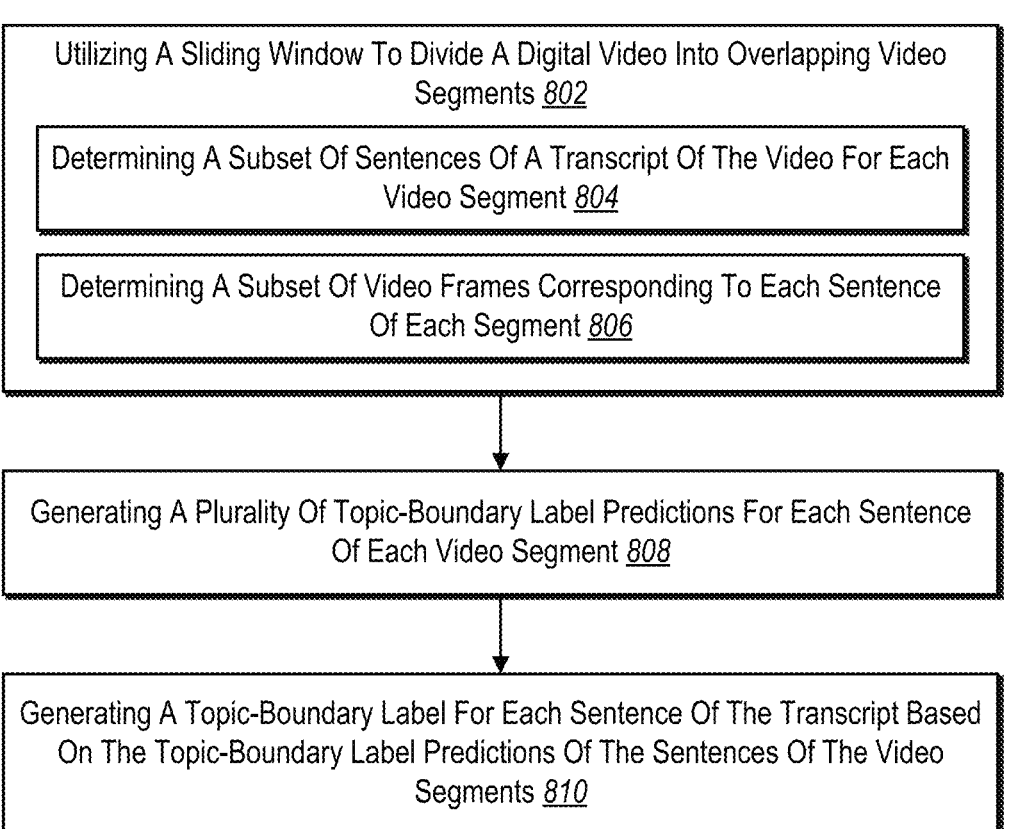

Utilizing A Sliding Window To Divide A Digital Video Into Overlapping Video Segments *802*

Determining A Subset Of Sentences Of A Transcript Of The Video For Each Video Segment *804*

Determining A Subset Of Video Frames Corresponding To Each Sentence Of Each Segment *806*

Generating A Plurality Of Topic-Boundary Label Predictions For Each Sentence Of Each Video Segment *808*

Generating A Topic-Boundary Label For Each Sentence Of The Transcript Based On The Topic-Boundary Label Predictions Of The Sentences Of The Video Segments *810*

*Fig. 8*

900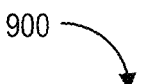

Generating, Utilizing A Cross-Modal Attention Model, Topic-Boundary Label Predictions For Sentences Of A Digital Video _902_

Modifying, Based On The Topic-Boundary Label Predictions, Parameters Of One Or More Layers Of The Cross-Modal Attention Model _904_

Modifying The Parameters Of The Cross-Modal Attention Model Based On A Cross-Modal Contrastive Loss _906_

Modifying The Parameters Of The Cross-Modal Attention Model Based On An Intra-Modal Contrastive Loss _908_

*Fig. 9*

1000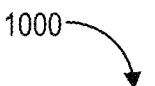

Generating Text Representations For Sentences Of A Transcript Of A Digital Video And Frame Representations For Video Frames Of The Digital Video *1002*

Utilizing A Sliding Window To Generate, From The Digital Video, Overlapping Video Segments Including Subsets Of Transcript Sentences And Corresponding Video Frames *1004*

Generating Topic-Boundary Labels For Each Sentence Of A Digital Video Based On The Text Representations And The Frame Representations *1006*

Determining Topic-Boundary Sentences From The Digital Video Based On The Topic-Boundary Labels *1008*

*Fig. 10*

DETERMINING TOPIC CHAPTERS FOR DIGITAL VIDEOS UTILIZING A SLIDING WINDOW AND VIDEO SEGMENTATION MACHINE LEARNING MODELS

BACKGROUND

Topic segmentation of digital videos is an increasingly important task in the fields of digital content creation, editing, and sharing. As video has become a more prevalent medium of recording and sharing content, computing systems are used more and more to edit or otherwise interact with digital videos. Specifically, the practice of dividing digital videos into topic chapters has recently seen an increase in use across many digital content platforms. However, existing video segmentation systems continue to suffer from inaccuracies by generating imprecise topic chapters for digital videos.

SUMMARY

Embodiments of the present disclosure provide benefits and/or solve one or more problems in the art with systems, non-transitory computer-readable media, and methods for segmenting digital videos into topic chapters utilizing a sliding window and video segmentation machine learning models. To illustrate, in some embodiments, the disclosed systems utilize a sliding window to divide a digital video and a transcript of the digital video into overlapping video segments. Further, in one or more implementations, the disclosed systems utilize segmentation machine learning models to generate a topic-boundary label prediction for each sentence in each video segment. Based on the topic-boundary label predictions for each sentence in the overlapping video segments, in one or more embodiments, the disclosed systems determine a topic-boundary label for each transcript sentence. Moreover, in one or more implementations, the disclosed systems train the cross-modal attention model utilizing an intra-modal contrastive loss and/or a cross-modal contrastive loss to adapt a cross-modal attention model to accurately segment long-form videos.

Additional features and advantages of one or more embodiments of the present disclosure are outlined in the description which follows, and in part are determined from the description, or are learned by the practice of such example embodiments.

BRIEF DESCRIPTION OF THE DRAWINGS

The detailed description provides one or more embodiments with additional specificity and detail through the use of the accompanying drawings, as briefly described below.

FIG. 5 illustrates a diagram of the video segmentation system training a cross-modal attention model utilizing intra-modal contrastive loss and/or cross-modal contrastive loss in accordance with one or more embodiments.

FIG. 8 illustrates an example series of acts for generating topic-boundary labels for transcript sentences of a digital video utilizing a sliding window and video segmentation machine learning models in accordance with one or more embodiments.

FIG. 9 illustrates an example series of acts for modifying parameters of a cross-modal attention model based on a cross-modal contrastive loss and/or an intra-modal contrastive loss in accordance with one or more embodiments.

FIG. 10 illustrates an example series of acts for determining topic-boundary sentences of a digital video in accordance with one or more embodiments.

DETAILED DESCRIPTION

Figure 1:
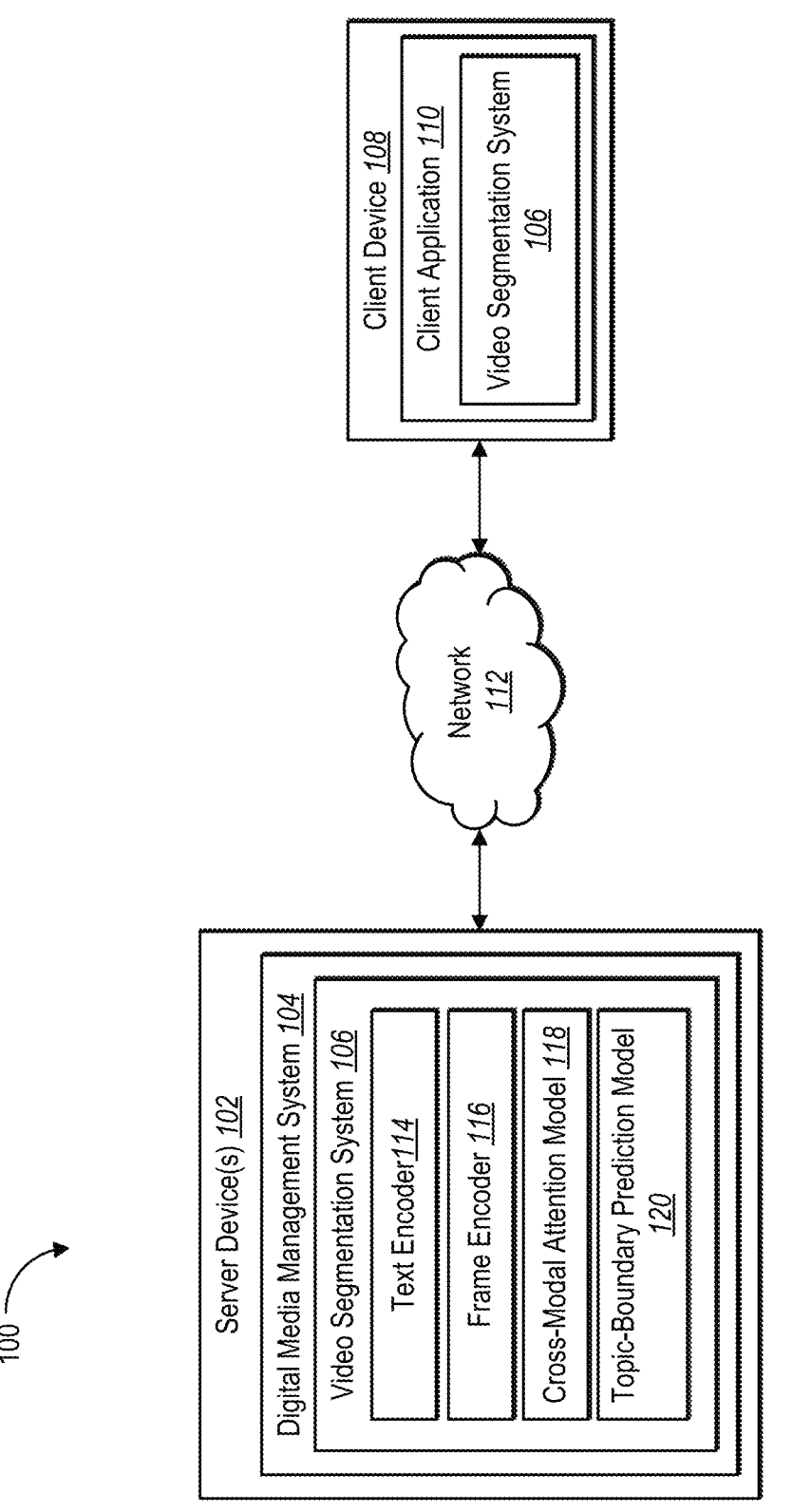
FIG. 1 illustrates an example system environment in which a video segmentation system operates in accordance with one or more embodiments.

This disclosure describes one or more embodiments of a video segmentation system that segments digital videos into topic chapters utilizing a sliding window and video segmentation machine learning models. To illustrate, in some embodiments, the video segmentation system utilizes a sliding window to divide a digital video and a transcript of the digital video into overlapping video segments. Furthermore, in some embodiments, the video segmentation system utilizes segmentation machine learning models to generate a topic-boundary label prediction for each sentence in each video segment. Based on the topic-boundary label predictions for each sentence in the overlapping video segments, in one or more implementations, the video segmentation system determines a topic-boundary label for each transcript sentence. Additionally, in one or more embodiments, the video segmentation system trains the cross-modal attention model utilizing an intra-modal contrastive loss and/or a cross-modal contrastive loss.

As mentioned above, in one or more implementations, the video segmentation system utilizes a sliding window to divide a digital video and a transcript of the digital video into overlapping video segments. In particular, the video segmentation system utilizes the sliding window to divide a digital video and corresponding transcript into segments. For example, in some embodiments, the video segmentation system divides a long-form video and corresponding transcript into overlapping segments using a sliding window with a fixed length (e.g., a fixed number of sentences or a fixed time length such as the length of a short-form video). In these or other embodiments, each segment of the digital video/transcript includes a subset of sentences of the transcript and each sentence is associated with video frames of the digital video.

As noted above, in one or more implementations, the video segmentation system utilizes segmentation machine learning models (e.g., including a cross-modal attention model) to generate a topic-boundary label prediction for each sentence in each video segment. Specifically, in one or more embodiments, the video segmentation system generates text representations from sentences of the video segments utilizing a text encoder. Moreover, in one or more implementations, the disclosed systems generates frame representations from frames of the video associated with the sentences utilizing a frame encoder. Further, in one or more implementations, the video segmentation system utilizes a cross-modal attention model to generate a topic-boundary label prediction for each sentence in each video segment based on the text representations and the frame representations.

As mentioned previously, in some embodiments, based on the topic-boundary label predictions for each sentence in the overlapping video segments, the video segmentation system determines a topic-boundary label for each transcript sentence. In particular, in one or more implementations, the video segmentation system determines a topic-boundary label prediction for a transcript sentence in each video segment that includes the transcript sentence. Moreover, in one or more embodiments, the video segmentation system utilizes the topic-boundary label predictions for the transcript sentence to determine a topic-boundary label for the sentence. Indeed, in one or more implementations, the topic-boundary labels of the transcript sentences indicate whether sentences of the transcript border a new topic in the video/transcript.

As noted previously, in some embodiments, the video segmentation system trains the cross-modal attention model utilizing an intra-modal contrastive loss and/or a cross-modal contrastive loss. Specifically, in one or more implementations, the video segmentation system utilizes the video segments generated via the sliding window to modify the parameters of the cross-modal attention model. For example, the video segmentation system utilizes the text representations of the sentences and the frame representations of the video frames to modify the parameters according to the intra-modal contrastive loss and/or the cross-modal contrastive loss. In one or more embodiments, by training the cross-modal attention model utilizing the intra-modal contrastive loss and/or the cross-modal contrastive loss, the video segmentation system adapts the cross-modal attention model to accurately segment long-form videos.

Although existing systems divide a digital video into chapter segments, such systems face problems with accuracy. For instance, existing systems often target shot or scene detection by merely leveraging surface visual features such as spatiotemporal aspects or frame colors. These systems typically measure temporal similarity along a video timeline to predict shot or scene boundaries. Moreover, some existing systems seek to uncover a semantic structure of a document (a monologue or dialogue) by dividing it into segments of topical sentences. However, existing systems often produce unreliable and imprecise chapter segments because they miss important contextual information that a transcript jointly shares with visual cues in the frames of the video.

Additionally, existing systems mostly focus on short-form videos with clear visual changes and simple patterns. These distinctive features of short-form videos are often emphasized in model design or learned in supervised setups of existing systems, making such models less adaptable to longer, more nuanced video content, like documentaries or instructional livestreams (e.g., long-form videos). Indeed, existing systems face significant challenges with accurately segmenting long-form videos by producing unreliable and imprecise chapter segments for long-form videos.

As suggested by the foregoing, embodiments of the video segmentation system provide advantages relative to existing systems. For example, the video segmentation system improves accuracy relative to existing systems by combining textual and visual features in a cross-modal attention mechanism, thereby capturing the contextual information that a video transcript jointly shares with video frames. Specifically, the video segmentation system treats video topic segmentation as a sequence labeling task and introduce a neural model equipped with a cross-modal attention mechanism going beyond simple fusion to effectively integrate textual and visual signals in a complementary manner. Specifically, the video segmentation system adapts a model trained on short videos to the low-resource domain containing long videos with subtler visual changes, by utilizing the semantic overlaps within a single modality or between two modalities to guide a contrastive learning process. For example, in one or more implementations, the video segmentation system adapts the cross-modal attention mechanism to long-form videos by utilizing a sliding window to divide long-form videos into segments and processing these segments with a cross-modal attention mechanism trained utilizing contrastive learning in the form of a cross-modal contrastive loss and/or an intra-modal contrastive loss. Thus, the video segmentation system improves accuracy of video topic segmentation for long-form videos over existing systems by training the cross-modal attention model to learn the correlation between textual and visual features of long-form videos.

Additional detail will now be provided in relation to illustrative figures portraying example embodiments and implementations of a video segmentation system. For example, FIG. 1 illustrates a system 100 (or environment) in which a video segmentation system 106 operates in accordance with one or more embodiments. As illustrated, the system 100 includes server device(s) 102, a network 112, and a client device 108. As further illustrated, the server device(s) 102 and the client device 108 communicate with one another via the network 112.

As shown in FIG. 1, the server device(s) 102 includes a digital media management system 104 that further includes the video segmentation system 106. In some embodiments, the video segmentation system 106 utilizes one or more video segmentation machine learning models (e.g., text encoder 114, frame encoder 116, cross-modal attention model 118, and/or topic-boundary prediction model 120) to determine topic chapters for a digital video. For example, in one or more implementations, the video segmentation system 106 utilizes the machine learning models to generate topic-boundary labels for sentences of a video transcript and their corresponding video frames. In some embodiments, the server device(s) 102 includes, but is not limited to, a computing device (such as explained below with reference to FIG. 7).

A machine learning model includes a computer representation that is tunable (e.g., trained) based on inputs to approximate unknown functions used for generating corresponding outputs. In particular, in one or more embodiments, a machine learning model is a computer-implemented model that utilizes algorithms to learn from, and make predictions on, known data by analyzing the known data to learn to generate outputs that reflect patterns and attributes of the known data. For instance, in some cases, a machine learning model includes, but is not limited to, a neural network (e.g., a convolutional neural network, recurrent neural network, or other deep learning network), a decision tree (e.g., a gradient boosted decision tree), support vector learning, Bayesian networks, a transformer-based model, a diffusion model, or a combination thereof.

Similarly, a neural network includes a machine learning model that is trainable and/or tunable based on inputs to determine classifications and/or scores, or to approximate unknown functions. For example, in some cases, a neural network includes a model of interconnected artificial neurons (e.g., organized in layers) that communicate and learn to approximate complex functions and generate outputs based on inputs provided to the neural network. In some cases, a neural network refers to an algorithm (or set of algorithms) that implements deep learning techniques to model high-level abstractions in data. A neural network includes various layers such as an input layer, one or more hidden layers, and an output layer that each perform tasks for processing data. For example, a neural network includes a deep neural network, a convolutional neural network, a diffusion neural network, a recurrent neural network (e.g., an LSTM), a graph neural network, a transformer, or a generative adversarial neural network.

In some instances, the video segmentation system 106 receives a request (e.g., from the client device 108) to segment a digital video. For example, the video segmentation system 106 obtains the digital video and receives a request to divide the digital video into chapters (e.g., video portions separated by changes in discussion topics). Some embodiments of server device(s) 102 perform a variety of functions via the digital media management system 104 on the server device(s) 102. To illustrate, the server device(s) 102 (through the video segmentation system 106 on the digital media management system 104) performs functions such as, but not limited to, generating text representations for transcript sentences, generating frame representations for video frames, generating text-aware visual representations associated with transcript sentences, and determining topic-boundary label predictions and/or topic-boundary labels for transcript sentences. In some embodiments, the server device(s) 102 utilizes the text encoder 114, the frame encoder 116, the cross-modal attention model 118, and/or the topic-boundary prediction model 120 to generate representations, topic-boundary label predictions and/or determine topic-boundary labels. In some embodiments, the server device(s) 102 trains the text encoder 114, the frame encoder 116, the cross-modal attention model 118, and/or the topic-boundary prediction model 120.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below with reference to FIG. 7. Some embodiments of client device 108 perform a variety of functions via a client application 110 on client device 108. For example, the client device 108 (through the client application 110) performs functions such as, but not limited to, generating text representations for transcript sentences, generating frame representations for video frames, generating text-aware visual representations associated with transcript sentences, and determining topic-boundary label prediction and/or topic-boundary labels for transcript sentences. In some embodiments, the client device 108 utilizes the text encoder 114, the frame encoder 116, the cross-modal attention model 118, and/or the topic-boundary prediction model 120 to generate representations, topic-boundary label predictions and/or determine topic-boundary labels.

To access the functionalities of the video segmentation system 106 (as described above and in greater detail below), in one or more embodiments, a user interacts with the client application 110 on the client device 108. For example, the client application 110 includes one or more software applications (e.g., to segment digital videos by topic in accordance with one or more embodiments described herein) installed on the client device 108, such as a digital media management application and/or a video editing application. In certain instances, the client application 110 is hosted on the server device(s) 102. Additionally, when hosted on the server device(s) 102, the client application 110 is accessed by the client device 108 through a web browser and/or another online interfacing platform and/or tool. Furthermore, in some embodiments, the client device 108, the server device(s) 102, or another system host one or more databases including digital data.

As illustrated in FIG. 1, in some embodiments, the video segmentation system 106 is hosted by the client application 110 on the client device 108 (e.g., additionally, or alternatively to being hosted by the digital media management system 104 on the server device(s) 102). For example, the video segmentation system 106 performs the video topic segmentation techniques described herein on the client device 108. In one or more implementations, the video segmentation system 106 utilizes the server device(s) 102 to train and implement machine learning models (such as the text encoder 114, the frame encoder 116, the cross-modal attention model 118, and/or the topic-boundary prediction model 120). In one or more embodiments, the video segmentation system 106 utilizes the server device(s) 102 to train machine learning models (such as the text encoder 114, the frame encoder 116, the cross-modal attention model 118, and/or the topic-boundary prediction model 120) and utilizes the client device 108 to implement or apply the machine learning models obtained from the server device(s) 102.

Further, although FIG. 1 illustrates the video segmentation system 106 being implemented by a particular component and/or device within the system 100 (e.g., the server device(s) 102 and/or the client device 108), in some embodiments the video segmentation system 106 is implemented, in whole or in part, by other computing devices and/or components in the system 100. For instance, in some embodiments, the video segmentation system 106 is implemented on another client device. More specifically, in one or more embodiments, the description of (and acts performed by) the video segmentation system 106 are implemented by (or performed by) the client application 110 on another client device.

In some embodiments, the client application 110 includes a web hosting application that allows the client device 108 to interact with content and services hosted on the server device(s) 102. To illustrate, in one or more implementations, the client device 108 accesses a web page or computing application supported by the server device(s) 102. The client device 108 provides input to the server device(s) 102 (e.g., a request to segment a digital video into topic chapters). In response, the video segmentation system 106 on the server device(s) 102 performs operations described herein to utilize video segmentation machine learning models to segment the digital video. The server device(s) 102 provides the output or results of the operations (e.g., topic-boundary label predictions and/or topic-boundary labels for sentences of a video transcript for the digital video, video topic chapters, etc.) to the client device 108.

As another example, in one or more implementations, the video segmentation system 106 on the client device 108 performs operations described herein to utilize video segmentation machine learning models to segment a digital video. The client device 108 provides the output or results of the operations (e.g., topic-boundary labels for sentences of a video transcript for the digital video, video topic chapters, etc.) via a display of the client device 108, and/or transmits the output or results of the operations to another device (e.g., the server device(s) 102 and/or another client device).

Additionally, as shown in FIG. 1, the system 100 includes the network 112. As mentioned above, in some instances, the network 112 enables communication between components of the system 100. In certain embodiments, the network 112 includes a suitable network and communicates using any communication platforms and technologies suitable for transporting data and/or communication signals, examples of which are described with reference to FIG. 7. Furthermore, although FIG. 1 illustrates the server device(s) 102 and the client device 108 communicating via the network 112, in certain embodiments, the various components of the system 100 communicate and/or interact via other methods (e.g., the server device(s) 102 and the client device 108 communicate directly).

Figure 2:
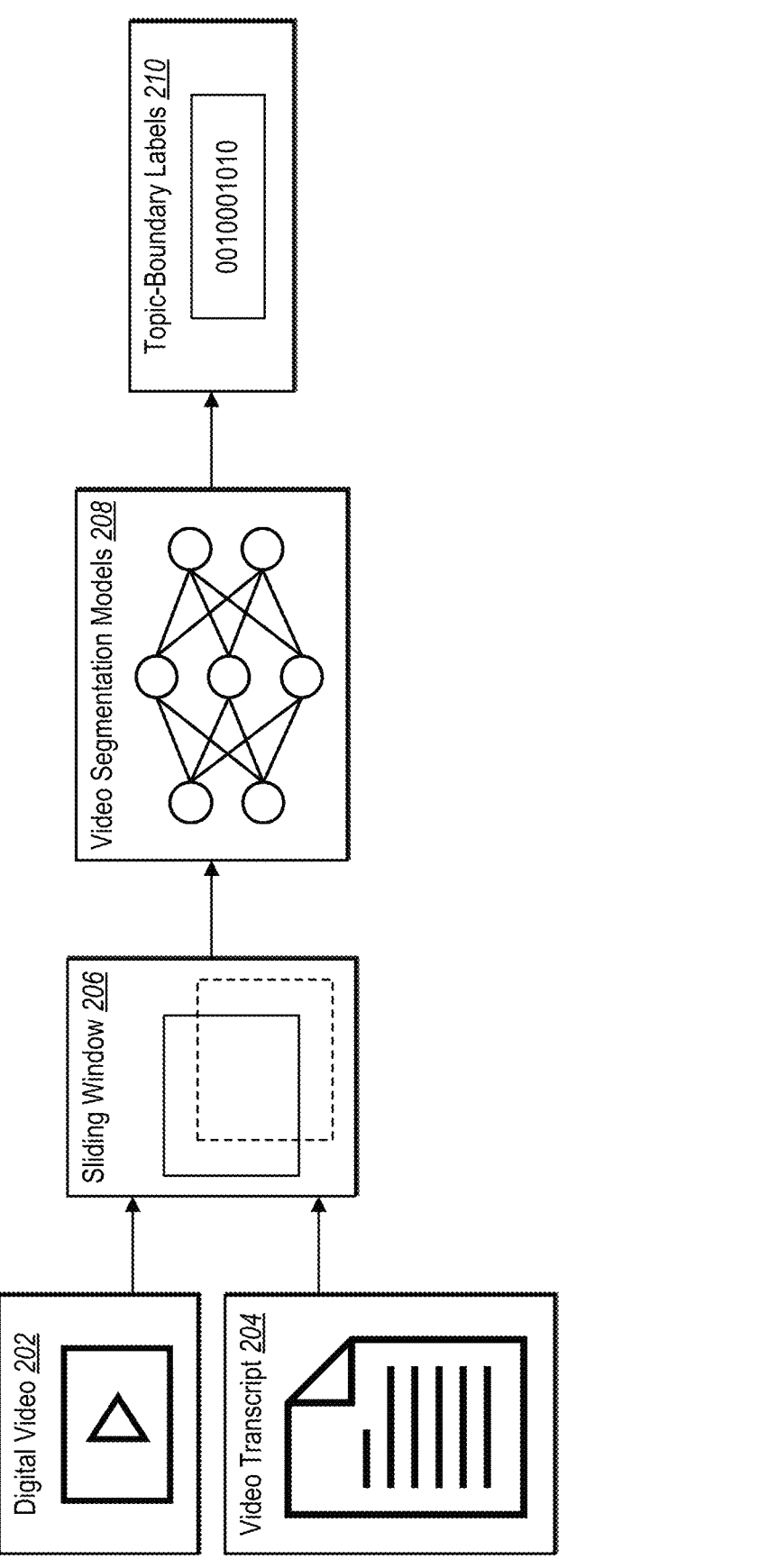
FIG. 2 illustrates an overview diagram of the video segmentation system segmenting digital videos into topic chapters utilizing a sliding window and video segmentation machine learning models in accordance with one or more embodiments.

As previously mentioned, in one or more implementations, the video segmentation system segments digital videos by topic. FIG. 2 illustrates an overview diagram of the video segmentation system 106 segmenting digital videos into topic chapters utilizing a sliding window and video segmentation machine learning models in accordance with one or more embodiments. As illustrated in FIG. 2, in one or more embodiments, the video segmentation system 106 divides a digital video 202 and corresponding video transcript 204 (i.e., a transcript of the words and sentences spoken in the digital video 202) into overlapping video segments. Specifically, in one or more implementations, the video segmentation system 106 utilizes a sliding window 206 to divide the digital video 202 and the video transcript 204 into overlapping video segments. For example, the video segmentation system 106 utilizes the sliding window 206 to divide the digital video into video segments that each include subsets of transcript sentences such that different video segments include at least some of the same transcript sentences. Additional detail regarding the video segmentation system 106 utilizing the sliding window 206 to divide the digital video 202 and the video transcript 204 into overlapping video segments is provided with respect to FIG. 3.

As further illustrated in FIG. 2, in some embodiments, the video segmentation system 106 generates topic-boundary labels 210 from the segments of the digital video utilizing one or more video segmentation models 208 (e.g., the text encoder 114, the frame encoder 116, the cross-modal attention model 118, and the topic-boundary prediction model 120). In particular, in some embodiments, the video segmentation system 106 determines the topic-boundary labels 210 for sentences of the video segments generated from the video transcript 204 associated with the digital video 202. For example, and as discussed in more detail below, the video segmentation system 106 generates frame representations from frames of the digital video 202 utilizing a frame encoder. A frame representation includes a numerical representation of features of an image (e.g., latent features and/or pixels of a video frame). For instance, in some cases, a frame representation includes a feature vector representation of a video frame. To illustrate, a frame representation includes a latent feature vector representation of a video frame generated by one or more layers of a neural network.

Additionally, the video segmentation system 106 generates text representations from sentences of the video segments from the video transcript 204 utilizing a text encoder. A text representation includes a numerical representation of features of a text string, such as a sentence or phrase spoken in a transcript of a video. For example, a text representation includes a feature vector or other numerical representation of latent features of a transcript sentence. For instance, a text representation includes a feature token, feature vector, or other numerical representation of features of a text string (e.g., features suggesting a semantic connotation or meaning).

Furthermore, in some embodiments, the video segmentation system 106 generates text-aware visual representations for the corresponding sentences of the video transcript 204 from the frame representations and the text representations of the various segments of the digital video 202 and the video transcript 204 utilizing a cross-modal attention model. A text-aware visual representation includes a feature vector or other numerical representation of combined features of a semantic text with related visual images. For example, a text-aware visual representation includes a feature vector representation of video frame features with corresponding semantic sentences spoken while the video frames were captured.

Moreover, in some embodiments, the video segmentation system 106 determines topic-boundary label predictions for the transcript sentences from the text-aware visual representations utilizing a topic-boundary prediction model. A topic-boundary label prediction indicates a likelihood that a sentence or phrase of a transcript borders or overlaps a transition in topics of the transcripts. Specifically, a topic-boundary label prediction indicates this likelihood for the sentence or phrase within a particular video segment of the digital video (e.g., generated via a sliding window). Additional detail regarding determining the topic-boundary label predictions is provided with respect to FIGS. 4A-4B.

In some cases, the video segmentation system 106 utilizes the topic-boundary label predictions to determine topic-boundary labels 210 for the digital video. In particular, the video segmentation system 106 determines topic-boundary labels based on the topic-boundary label predictions for each sentence in the video segments generated via the sliding window 206. For example, the video segmentation system 106 utilizes the topic-boundary label predictions of a transcript sentence from the video segments containing the transcript sentence determine a topic-boundary label for the sentence and performs this process for each transcript sentence. A topic-boundary label includes a determination for a sentence or phrase of a transcript that indicates that the sentence or phrase borders or overlaps a transition in topics of the transcript. Additional detail regarding determining topic-boundary labels 210 for the digital video is provided with respect to FIG. 6.

Further, in one or more implementations, based on the topic-boundary labels, the video segmentation system 106 generates a segmented digital video based on the topic-boundary labels. Specifically, the video segmentation system 106 determines topic-boundary sentences from the digital video using the topic-boundary labels. Moreover, in one or more embodiments, the video segmentation system 106 determines topic chapters for the digital video using the topic-boundary sentences and generates the segmented digital video using the topic chapters as described in further detail with respect to FIG. 6.

Furthermore, in one or more implementations, the video segmentation system 106 trains the cross-modal attention model to accurately segment both short-form videos and long-form videos. In particular, in some embodiments, the video segmentation system 106 modifies the parameters of at least some of the layers of the cross-modal attention model using short-form videos with labeled topic boundaries in a first (i.e., preliminary) training stage. Additionally, in one or more implementations, the video segmentation system 106 modifies the parameters of layers of the cross-modal attention model using video segments of long-form videos (e.g., by dividing the long-form videos with a sliding window). In these or other embodiments, the video segmentation system 106 modifies the parameters using a cross-modal contrastive loss and/or intra-modal contrastive loss. Further, in one or more embodiments, the video segmentation system 106 modifies the parameters of layers of the cross-modal attention model using short-form videos with labeled topic boundaries in an additional training stage. Additional detail regarding training the cross-modal attention model is provided with respect to FIG. 5.

Figure 3:
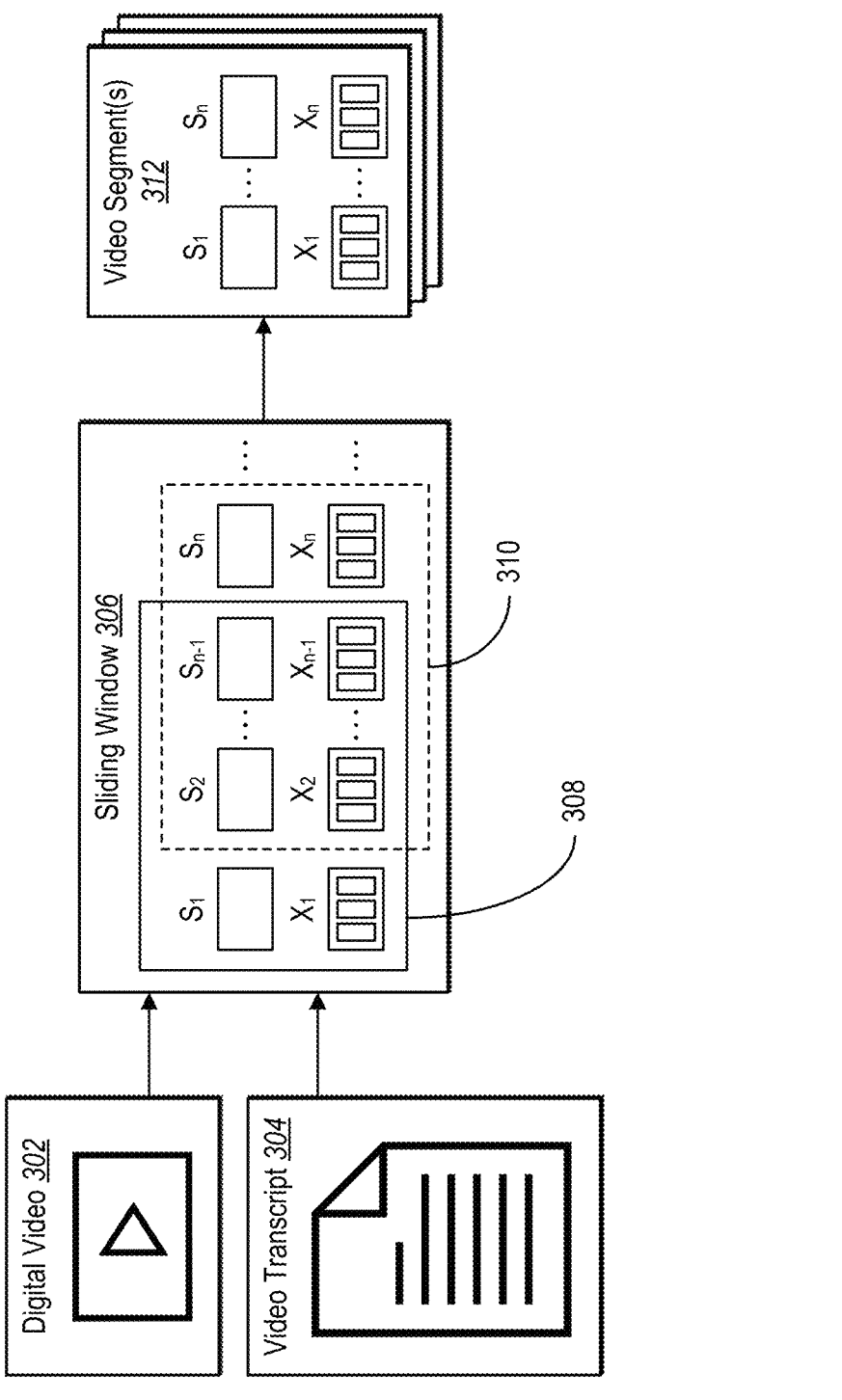
FIG. 3 illustrates a diagram of the video segmentation system utilizing a sliding window to divide a digital video and a transcript of the digital video into overlapping video segments in accordance with one or more embodiments.

As previously noted, in one or more implementations, the video segmentation system 106 divides a digital video 302 (e.g., digital video 202) and corresponding video transcript 304 (e.g., video transcript 204) into overlapping video segments. FIG. 3 illustrates a diagram of the video segmentation system utilizing a sliding window to divide a digital video and a transcript of the digital video into overlapping video segments in accordance with one or more embodiments.

As shown in FIG. 3, in some embodiments, the video segmentation system 106 utilizes a sliding window 306 to divide the digital video 302 into overlapping video segments 312. Specifically, in one or more implementations, the video segmentation system 106 divides a long-form video into overlapping segments. A long-form video includes a digital video with a relatively long duration (e.g., more than 10 minutes to hours in duration). Moreover, in one or more embodiments, a long-form video includes a digital video with complex and/or subtle visual changes and intricate patterns, designed to convey detailed information or tell an in-depth story over a long period of time. For instance, in one or more implementations, digital videos include digital documentaries, instructional livestreams (e.g., or recordings thereof), feature films, etc. In contrast to long-form videos, short-form videos include short digital videos with clear visual changes and simple patterns. For example, a short-form video may include online videos of short duration (e.g., less than 15 minutes in duration) such as those often included on popular video streaming platforms. In some instances, short-form videos include labeled topic boundaries dividing the video into different sections such as chapters.

As mentioned, in some embodiments, the video segmentation system 106 divides the digital video 302 and the video transcript 304 into overlapping video segments 312. In particular, in one or more implementations, the video segmentation system 106 determines a series of sentences or phrases (referred to herein simply as "sentences" or "transcript sentences") in the video transcript 304. To illustrate, the video segmentation system 106 determines that the video transcript 304 includes a first sentence (represented as $s_1$ in FIG. 3), a second sentence (represented as $s_2$ in FIG. 3), etc. Further, the video segmentation system 106 determines a set of video frames corresponding to each sentence of the transcript. To illustrate, the video segmentation system 106 determines that a first set of video frames (represented as $X_1$ in FIG. 3) correspond to the first sentence $s_1$. Specifically, in one or more embodiments, the video segmentation system 106 determines that the first set of video frames $X_1$ includes the video frames within a time interval beginning with a beginning time stamp and ending with an ending time stamp of the corresponding transcript sentence $s_1$.

As additionally shown in FIG. 3, in one or more implementations, the video segmentation system 106 utilizes the sliding window 306 to divide the sentences of the video transcript 304 and the frames of the digital video 302 into overlapping video segments 312. In particular, the video segmentation system 106 divides the sentences and frames such that each video segment includes a subset of sentences of the video transcript 304 and the video frames corresponding to the subset of sentences. Furthermore, in some embodiments, the video segmentation system 106 generates the overlapping video segments 312 such that each subset of sentences of each video segment includes one or more sentences not included in a previous overlapping segment.

In one or more implementations, a sliding window includes a sliding window of a fixed length. For example, in one or more embodiments, the sliding window includes a fixed length such as a fixed number of sentences or a fixed number of minutes (e.g., 5 minutes, 10 minutes, 15 minutes, 20 minutes). Additionally, in one or more implementations, the video segmentation system 106 utilizes a sliding window with a fixed length that matches the length (e.g., the average length) of a specific type of digital video, such as a short-form video. For example, the sliding window includes a fixed number of sentences that matches the average number of sentences in a short-form video or includes a fixed time length that matches the average time length of a short-form video. Further, in some embodiments, the video segmentation system 106 moves the sliding window over the video transcript 304 and/or the digital video 302 with a specified stride (e.g., a stride of 1 sentence) to generate the overlapping video segments 312.

To illustrate, the video segmentation system 106 generates a first video segment using the sliding window 306 at a first position 308. Indeed, the video segmentation system 106 generates the first video segment to include a subset of transcript sentences $s_1$-$s_{n-1}$ and corresponding sets of video frames $X_1$-$X_{n-1}$ which fit within the sliding window 306 at the first position 308. Moreover, in one or more implementations, the video segmentation system 106 generates a second video segment by sliding the sliding window 306 at a stride of 1 sentence to a second position 310. Indeed, the video segmentation system 106 generates the second video segment to include transcript a second subset of transcript sentences $s_2$-$s_n$ and corresponding sets of video frames $X_2$-$X_n$. Furthermore, in one or more embodiments, the video segmentation system 106 continues to generate the overlapping video segments 312 by sliding the sliding window 306 over the digital video 302 and/or the video transcript 304 such that the transcript sentences are included in at least one video segment 312.

More formally, given a long-form video with a length n and a fixed window length k, the video segmentation system 106 generates n–k+1 video segments 312 $\{\mathbb{S}_1, \ldots, \mathbb{S}_{n-k+1}\}$. In one or more implementations, each video segment 312 consists of k consecutive transcript sentences by sliding the sliding window 306 over the digital video 302 and/or the video transcript 304 with a stride of 1 sentence. As a result, the video segmentation system 106 includes each transcript sentence $s_m$ in up to k video segments 312. Further, in some embodiments, the video segmentation system 106 generates multiple topic-boundary label predictions for each transcript sentence from the overlapping video segments 312 utilizing video segmentation machine learning models as described in further detail with respect to FIGS. 4A-4B.

As discussed, in some embodiments, the video segmentation system 106 utilizes video segmentation machine learning models (e.g., video segmentation models 208) to generate representations and determine topic-boundary label predictions. For instance, FIGS. 4A and 4B illustrate the video segmentation system 106 processing a subset of transcript sentences and corresponding video frames of one of the overlapping video segments through video segmentation machine learning models to determine topic-boundary label predictions for the transcript sentences in accordance with one or more embodiments.

Figure 4A:
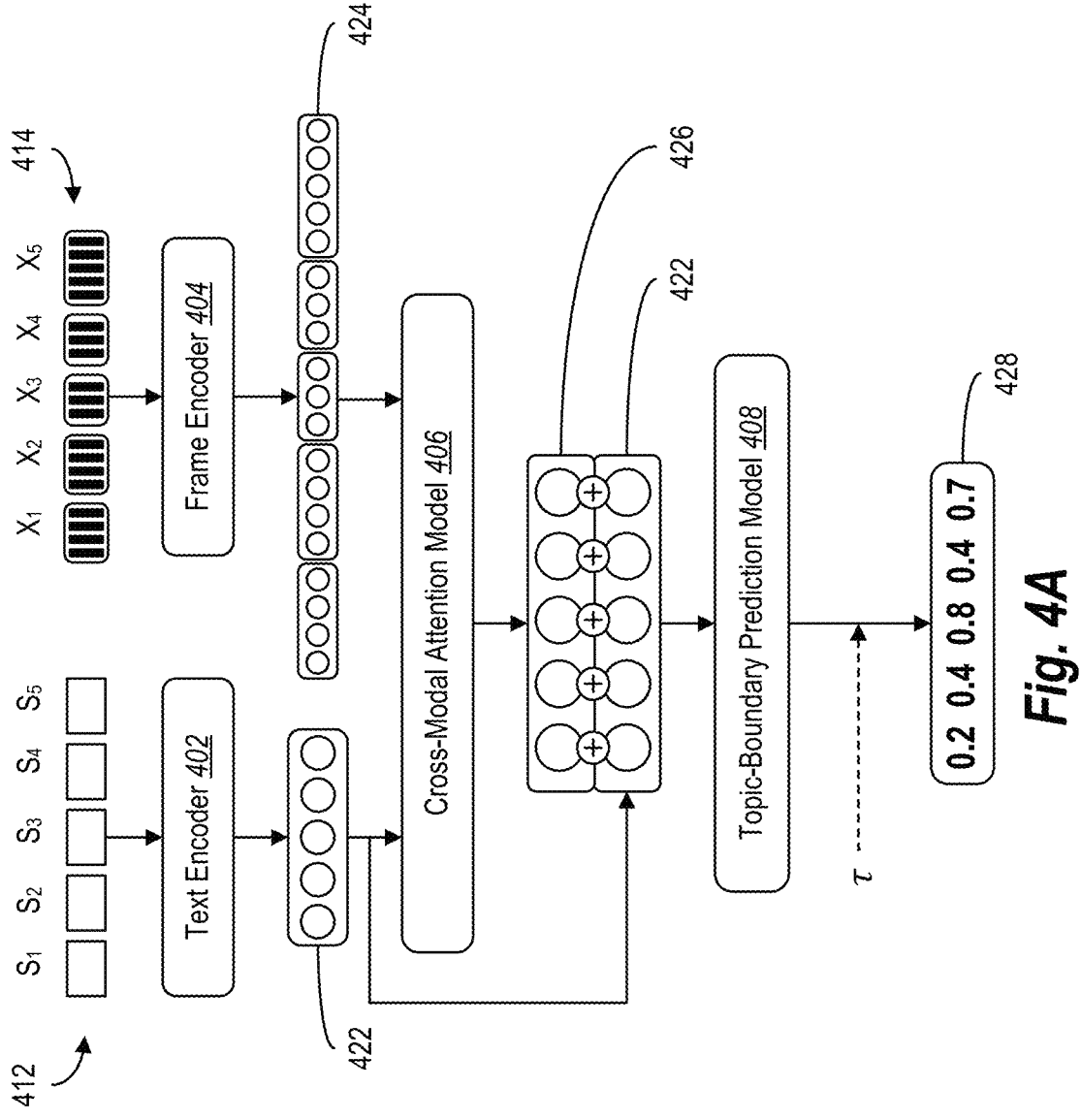
FIGS. 4A-4B illustrate diagrams of exemplary architecture of components of the video segmentation system in accordance with one or more embodiments.
Figure 4B:
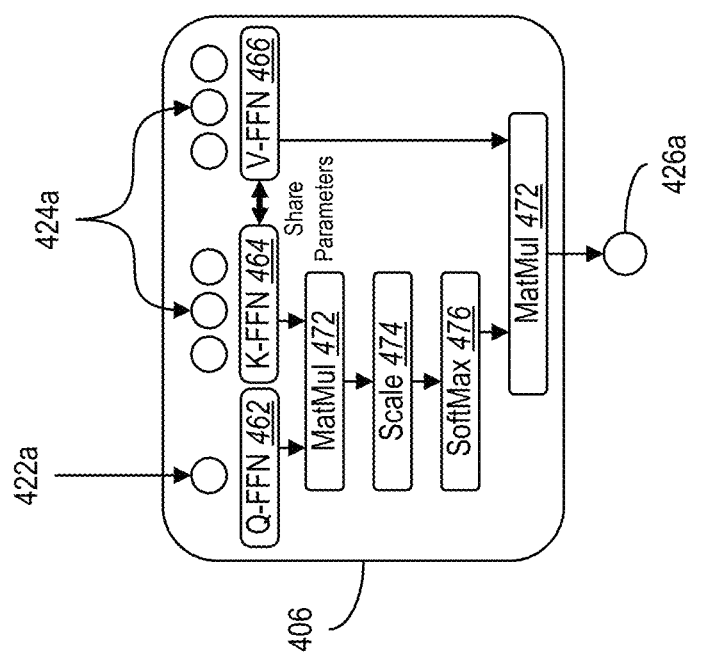

Specifically, FIG. 4A shows the video segmentation system 106 processing a subset of transcript sentences 412 (e.g., represented symbolically as $s_1$, $s_2$, $s_3$, $s_4$, and $s_5$) of a one of the overlapping video segments through a text encoder 402 (e.g., text encoder 114) to generate text representations 422 for the subset of transcript sentences 412. For example, the video segmentation system 106 utilizes the text encoder 402 to encode contextualized features into a text representation (e.g., a numerical representation) for each transcript sentence of the subset of transcript sentences 412. In some embodiments, the video segmentation system 106 utilizes a text encoder in the form of a Bidirectional Encoder Representations from Transformers (BERT) model trained to derive text representations to embed sentences within a metric space. In some cases, the text encoder 402 includes various language models, such as, but not limited to, BERT models, neural word embedding models, and/or global vector models.

In addition, FIG. 4A shows the video segmentation system 106 processing sets of video frames 414 (e.g., represented symbolically as $X_1$, $X_2$, $X_3$, $X_4$, and $X_5$) of a video segment corresponding to the subset of sentences of the video segment through a frame encoder 404 (e.g., frame encoder 116) to generate sets of frame representations 424 for the sets of video frames 414. For example, the video segmentation system 106 utilizes the frame encoder 404 to extract features of visual signals in the frames of each set of video frames 414. In some embodiments, the frame encoder 404 is a neural network (or one or more layers of a neural network) that extract features of a video frame (e.g., localized features or global features of the digital image). In some cases, a frame encoder refers to a neural network that both extracts and encodes features from a video frame. For example, in one or more implementations, a frame encoder includes a particular number of layers including one or more fully connected and/or partially connected layers of neurons that extract frame patches from the video frame and encode localized and/or global features of the video frame. In some embodiments, the video segmentation system 106 utilizes a frame encoder in the form of a deep residual network. In some cases, the frame encoder 404 comprises a ResNet18 model.

Furthermore, FIG. 4A shows the video segmentation system 106 generating text-aware visual representations 426 from the text representations 422 and the sets of frame representations 424 utilizing a cross-modal attention model 406 (e.g., cross-modal attention model 118). Additional detail of the cross-modal attention model 406 is given below in relation to FIG. 4B. In one or more embodiments, a set of video frames corresponds to a transcript sentence. More particularly, a set of video frames includes the video frames within a time interval beginning with a beginning time stamp and ending with an ending time stamp of a corresponding transcript sentence. To illustrate, $X_1$ represents a set of video frames that correspond with a first sentence (i.e., $s_1$) of the video segment, $X_2$ represents a set of video frames that correspond with a second sentence (i.e., $s_2$), etc.

Moreover, FIG. 4A shows the video segmentation system 106 determines topic-boundary label predictions 428 for the transcript sentences 412 from the text-aware visual representations 426 and the text representations 422 utilizing a topic-boundary prediction model 408 (e.g., topic-boundary prediction model 120). For example, in some embodiments, the video segmentation system 106 combines the text-aware visual representations 426 and the text representations 422. To illustrate, the video segmentation system 106 concatenates individual text representations with their corresponding text-aware visual representations before utilizing the topic-boundary prediction model 408.

In one or more implementations, the topic-boundary prediction model 408 includes a bi-directional LSTM (long short-term memory) and a multilayer perceptron. For instance, in one or more implementations, the video segmentation system 106 utilizes the bi-directional LSTM of the topic-boundary prediction model 408 to determine hidden states of each transcript sentence from the corresponding combined text-aware visual representation and corresponding text representation. To illustrate, the video segmentation system 106 determines the hidden states of the transcript sentence utilizing the bi-directional LSTM by evaluating contextual features of the transcript sentence in relation to other transcript sentences (e.g., neighboring sentences in the transcript, nearby sentences in the transcript, all sentences in the transcript, etc.). Moreover, in one or more implementations, the video segmentation system 106 utilizes the multilayer perceptron of the topic-boundary prediction model 408 to determine a topic-boundary label prediction.

As mentioned, in some embodiments, the video segmentation system 106 approaches video topic segmentation as a sequence labeling task. Thus, the video segmentation system 106 operates on multiple transcript sentences and multiple corresponding sets of video frames to generate a sequence of topic-boundary label predictions for each video segment. For example, the video segmentation system 106 generates multiple text-aware visual representations (e.g., a first and a second text-aware visual representation, etc.) for each transcript sentence. The video segmentation system 106 likewise determines a topic-boundary label prediction (e.g., a first and a second topic-boundary label prediction, etc.) for each transcript sentence in each video segment from the multiple text-aware visual representations, as described above. For instance, the video segmentation system 106 generates topic-boundary label predictions 428 for the transcript sentences $s_1$-$s_5$ of a first video segment. To illustrate, the video segmentation system 106 determines topic-boundary label predictions 428 with values of 0.2, 0.4, 0.8, 0.4, and 0.7 for $s_1$-$s_5$, respectively, as shown in FIG. 4A.

In one or more implementations, the video segmentation system 106 uses the topic-boundary prediction model 408 to generate an output dependent on the input to the video segmentation system 106. For example, as just described, the video segmentation system 106 uses the topic-boundary prediction model 408 to generate the topic-boundary label predictions 428 for sentences included in each video segment when the video segmentation system 106 receives a long-form video as an input. Additionally, in some embodiments, the video segmentation system 106 generates a sequence of topic-boundary labels based on a short-form video input to the video segmentation system 106. Indeed, the video segmentation system 106 generates a sequence of binary topic-boundary labels for the video transcript by comparing the hidden states of each transcript sentence with a predetermined topic-boundary threshold (e.g., represented symbolically as $\tau$). In these or other embodiments, the video segmentation system 106 uses a topic-boundary predictor to make binary predictions indicating whether a transcript sentence represents a topic segment boundary as described further below.

As mentioned above, in one or more implementations, the video segmentation system 106 generates the text-aware visual representations 426 from the text representations 422 and the sets of frame representations 424 utilizing the cross-modal attention model 406. FIG. 4B shows additional detail of this process. In particular, FIG. 4B shows the video segmentation system 106 generating a query vector from a text representation 422a utilizing a query feedforward layer 462 of the cross-modal attention model 406. In addition, the video segmentation system 106 generates a key matrix from a set of frame representations 424a (e.g., corresponding in time to the text representation 422a of a corresponding transcript sentence) of the sets of frame representations 424 utilizing a key feedforward layer 464 of the cross-modal attention model 406. Moreover, in some embodiments, the video segmentation system 106 also generates a value matrix from the set of frame representations 424a utilizing a value feedforward layer 466 of the cross-modal attention model 406. In one or more implementations, the key feedforward layer 464 and the value feedforward layer 466 share identical parameters. Thus, in one or more implementations, the video segmentation system 106 generates a value matrix from the set of frame representations 424a that is identical to the key matrix. Alternatively, in some embodiments, the key feedforward layer 464 and the value feedforward layer 466 have different parameters.

Furthermore, in some embodiments, the video segmentation system 106 combines the query vector with the key matrix and the value matrix. For example, the video segmentation system 106 multiplies the query vector and the key matrix in a matrix multiplication operation 472. Additionally, in some embodiments, the video segmentation system 106 utilizes a scaling operation 474 and/or a softmax operation 476 on the product of the query vector and the key matrix. Moreover, the video segmentation system 106 multiplies the result of these operations with the value matrix to generate a text-aware visual representation 426a (e.g., of the text-aware visual representations 426) for the corresponding transcript sentence. As described above, in some embodiments, the video segmentation system 106 utilizes the text-aware visual representation 426a to generate a topic-boundary label prediction for the corresponding transcript sentence (e.g., by concatenating the text-aware visual representation 426a with its corresponding text representation 422a and processing the concatenated representation through the topic-boundary prediction model 408).

As mentioned, by utilizing the cross-modal attention model 406 to produce text-aware visual representations for each sentence, the video segmentation system 106 enhances accuracy of the topic segmentations by distilling contextual information shared with both modes of the video (i.e., textual and visual information), rather than naively operating mean-pooling over the sets of frame representations covered by the sentence interval. Specifically, by utilizing cross-modal attention, the video segmentation system 106 gives more attention weight to those frames that share more semantic meaning with the text. Relatedly, frames with less relevance to semantic meaning (e.g., sharing little or no semantics with the text) are given less attention weight.

The video topic segmentation techniques described above are also represented symbolically. Given a digital video and an associated transcript, the transcript has a sequence of sentences $\{s_1, s_2, \ldots, s_n\}$ along with start time offsets $\{b_1, b_2, \ldots, b_n\}$ and end time offsets $\{e_1, e_2, \ldots, e_n\}$, and the video has video frames $X, =\{x_1, x_2, \ldots, x_m\}$, where a single frame xi has a timestamp ti. The video segmentation system 106 predicts a sequence of topic-boundary label predictions or topic-boundary labels (depending upon the input as described above) $\{l_1, l_2, \ldots, l_{n-1}\}$ for the sequence of transcript sentences. For instance, when the input includes a long-form video, the video segmentation system 106 generates the topic-boundary label predictions 428. Alternatively, when the input includes a short-form video, the video segmentation system 106 generates the topic-boundary labels such that 1 is a binary label denoting that the corresponding sentence overlaps a video topic segment boundary, and 0 denotes otherwise. For example, in one or more implementations, the video segmentation system 106 assigns a 1 if the hidden states exceed the topic-boundary threshold and a 0 if not. In one or more implementations, the video segmentation system 106 utilizes a 1 to denote the sentence borders an ending of a topic chapter. Alternatively, in some embodiments, the video segmentation system 106 utilizes a 1 to denote that the sentence borders a beginning of a topic chapter. Moreover, in one or more implementations, the video segmentation system 106 does not predict a label for the last (or, alternatively, first) sentence $s_n$ of the transcript, as the last sentence (or alternatively, the first sentence) is at the end of a topic segment by default, and therefore is assigned a 1 for a topic-boundary label.

The operation of the text encoder is denoted as $E_t$ and the operation of the frame encoder is denoted as $E_f$. Given a transcript sentence $s_i$ with time interval $[b_1, e_1]$, and a corresponding set of video frames $X_i=\{x_1{}^i, x_2{}^i, \ldots, x_m{}^i\}$ associated with the sentence, the video segmentation system 106 obtains the text representation $tr_i=E_t(s_i)$ and its corresponding set of frame representations $FR_i=\{fr_1{}^i, fr_2{}^i, \ldots fr_m{}^i\}$ where $fr_k{}^i=E_f(x_k{}^i)$.

With the transcript sentence representation $tr_i$ and its corresponding frame representation set $FR_i$, the video segmentation system 106 computes text-aware visual representations $vr_i$ as:

$$vr_i = A_i V_i$$

$$A_i = \text{softmax}\left(\frac{q_i K_i^T}{\sqrt{d_k}}\right)$$

where $q_i \in \mathbb{R}^{1 \times d_k}$, $K_i \in \mathbb{R}^{m \times d_k}$ and $V_i \in \mathbb{R}^{m \times d_k}$ denote the query vector, key matrix, and value matrix, respectively, generated by passing the text representation and set of frame representations through three parallel feedforward layers, namely Q-FFN, K-FFN, and V-FFN, respectively. More formally, $q_i=\text{QFFN}(tr_i)$, $K_i=\text{KFFN}(FR_i)$, and $V_i=\text{VFFN}(FR_i)$. As mentioned, in some embodiments, K-FFN and V-FFN share the same parameters and thus produce identical key and value matrices.

Additionally, in one or more implementations, the video segmentation system 106 concatenates the text-aware visual representations $\{vr1, \ldots, vrn\}$ with their corresponding text representations $\{tr1, \ldots, trn\}$ and feeds them into a bi-directional LSTM layer to perform contextualization and return hidden states. Next, in one or more embodiments, the video segmentation system 106 utilizes a multilayer perceptron followed by softmax to generate the topic-boundary label predictions or the topic-boundary labels. For instance, the video segmentation system 106 utilizes the multilayer perceptron and softmax to generate the topic-boundary label predictions 428 in cases where the input includes a long-form video. Alternatively, in cases where the input includes a short-form video, the video segmentation system 106 utilizes the multilayer perceptron followed by the softmax to serve as a topic-boundary predictor to make binary predictions regarding the input hidden states according to a threshold T tuned on the validation set. In these or other embodiments, if a transcript sentence has an output probability that exceeds r, the sentence is assigned a 1, indicating a topic segment boundary. In some embodiments, the video segmentation system 106 fine-tunes the video segmentation machine learning models utilizing a cross-entropy loss.

As mentioned above, in one or more implementations, the video segmentation system 106 trains the cross-modal attention model (e.g., cross-modal attention model 118 or cross-modal attention model 406) utilizing an intra-modal contrastive loss and/or a cross-modal contrastive loss. Indeed, in some embodiments, the video segmentation system 106 utilizes the intra-modal contrastive loss and the cross-modal contrastive loss to adapt the cross-modal attention model to accurately segment long-form videos. FIG. 5 illustrates a diagram of the video segmentation system training a cross-modal attention model utilizing intra-modal contrastive loss and/or cross-modal contrastive loss in accordance with one or more embodiments.

As portrayed in FIG. 5, in one or more implementations, the video segmentation system 106 trains the cross-modal attention model 502 by modifying parameters of one or more layers of the cross-modal attention model 502 utilizing contrastive loss. In particular, in one or more embodiments, the video segmentation system 106 modifies the parameters of layers of the cross-modal attention model 502 utilizing an intra-modal contrastive loss 504 and/or a cross-modal contrastive loss 508. In these or other embodiments, the video segmentation system 106 utilizes the text representations ($tr_i$ . . . $tr_j$) and corresponding sets of frame representations ($fr_i$ . . . $fr_j$) from video segments (e.g., overlapping video segments 312) generated as described above with respect to FIG. 3. In one or more implementations, the video segmentation system 106 modifies the parameters of one or more layers of the cross-modal attention model using both intra-modal contrastive loss 504 and cross-modal contrastive loss 508. Further, in some embodiments, the video segmentation system 106 modifies the parameters of the one or more layers of the cross-modal attention model without modifying parameters of the text encoder and the frame encoder (i.e., by fixing the parameters of the text encoder and the frame encoder while training the cross-modal attention model).

In one or more implementations, contrastive loss includes a loss function for training a machine learning model to differentiate between similar and dissimilar pairs of data. For example, the video segmentation system 106 differentiates between pairs of text representations, frame representations, and/or text representations and frame representations such as by generating positive and negative examples. Moreover, in one or more embodiments, the intra-modal contrastive loss 504 includes differentiating between frame representations of different sentences as described further below. Furthermore, in one or more implementations, the cross-modal contrastive loss 508 includes differentiating between text representations and frame representations as described further below.

As further illustrated in FIG. 5, in some embodiments, the video segmentation system 106 modifies the parameters of the cross-modal attention model utilizing the intra-modal contrastive loss 504 by projecting the sets of frame representations ($FR_i$-$FR_j$) into a shared embedding space (i.e., an embedding space shared with projected text representations as described further below). Specifically, in one or more implementations, the video segmentation system 106 utilizes the layer K-FFN (or V-FFN in cases where K-FFN and V-FFN share parameters) to project the frame representations into the shared embedding space. In these or other embodiments, $K_i$=K-FFN($FR_i$) and $K_i$={$k_1^i$, . . . , $k_m^i$} denoting the set of projected frame representations of a transcript sentence (e.g., the projected set of frame representations 506a or 506b).

As also depicted in FIG. 5, in one or more embodiments, the video segmentation system 106 utilizes the intra-modal contrastive loss 504 to minimize the distance between the projected set of frame representations 506a corresponding to a first transcript sentence (i.e., the positive example). Additionally, in one or more implementations, the video segmentation system 106 utilizes the intra-modal contrastive loss 504 to maximize the distance between the projected set of frame representations 506a corresponding to the first transcript sentence and the projected set of frame representations 506b of a second transcript sentence (i.e., the negative example). Further, in some embodiments, the video segmentation system 106 maximizes the distance between the projected set of frame representations 506a of the first transcript sentence and the projected set of frame representations of a third transcript sentence (i.e., an additional negative example). For instance, in one or more implementations, the video segmentation system 106 utilizes the intra-modal contrastive loss function $l^{intra}$ $$l^{intra} = -\sum_{i=1}^{b} \log \frac{\exp(\tilde{k}^i \cdot \tilde{k}^i)/\tau}{\sum_{j=1}^{b}\exp(\tilde{k}^i \cdot \tilde{k}^j)/\tau}$$

In $l^{intra}$ $\tilde{k}^i \in R$ $FR_i$ and $\tau$ is the hyper-parameter of temperature.

As further illustrated in FIG. 5, in one or more embodiments, the video segmentation system 106 modifies the parameters of the cross-modal attention model utilizing the cross-modal contrastive loss 508 by projecting the text representations into the shared embedding space with the projected frame representations 506a-b. In particular, the video segmentation system 106 utilizes the layer Q-FFN as a projection head to project the text representations ($tr_i$-$tr_j$) into the shared embedding space. In these or other embodiments, $qi$=Q-FFN($tr_i$) denotes a projected transcript text representation (e.g., projected text representations 510a or 510b) and $K_i$={$k_1^i$, . . . , $k_m^i$} denotes the set of projected frame representations of a transcript sentence (e.g., the projected set of frame representations 506a or 506b).

As additionally shown in FIG. 5, in one or more implementations, the video segmentation system 106 utilizes the cross-modal contrastive loss 508 to minimize the distance between a text representation of a first transcript sentence (e.g., $s_1$) projected into the shared embedding space (e.g., the projected text representation 510a) and the corresponding set of frame representations projected into the shared embedding space (e.g., the projected set of frame representations 506a). Specifically, in some embodiments, the video segmentation system 106 first generates an aggregated frame representation 512a (e.g., by mean-pooling or other aggregating method) of the projected set of frame representations 506a then minimizes the distance between the projected text representation 510a and the aggregated frame representation 512a (i.e., the positive example). Moreover, in one or more implementations, the video segmentation system 106 maximizes the distance between the projected text representation 510*a* and a second projected set of frame representations (e.g., the projected set of frame representations 506*b*) corresponding to a second transcript sentence (e.g., $s_2$). In particular, in one or more embodiments, the video segmentation system 106 first generates an additional aggregated frame representation 512*b* (e.g., by mean-pooling or other aggregating method) of the projected set of frame representations 506*b* then maximizes the distance between the projected text representation 510*a* and the aggregated frame representation 512*b* (i.e., the negative example). For example, in one or more implementations, the video segmentation system 106 utilizes the cross-modal contrastive loss function $l^{cross}$.

$$l^{cross} = -\sum_{i=1}^{b} \log \frac{\exp(q_i \cdot MP(K_i))/\tau}{\sum_{j=1}^{b} \exp(q_i \cdot MP(K_j))/\tau}$$

In $l^{cross}$ MP denotes mean-pooling.

As noted above, in some embodiments, the video segmentation system 106 utilizes both the intra-modal contrastive loss and the cross-modal contrastive loss to modify the parameters of the cross-modal attention model. In these or other embodiments, the video segmentation system 106 modifies the parameters of the cross-modal attention model using a total loss function l:

$$l = l^{intra} + l^{cross}$$

In one or more implementations, the video segmentation system 106 trains the cross-modal attention model using the losses as described above. For instance, the video segmentation system 106 utilizes the cross-modal attention model during training to generate topic-boundary label predictions for subsets of sentences in overlapping video segments of long-form videos as described above with respect to FIGS. 4A-4B. Furthermore, in these or other embodiments, the video segmentation system 106 modifies the parameters of the cross-modal attention model based on the topic-boundary label predictions generated during training.

As mentioned previously, in one or more embodiments, the video segmentation system 106 modifies one or more layers of the cross-modal attention model using the losses described above. Specifically, in one or more implementations, the video segmentation system 106 modifies the three parallel feedforward layers, namely Q-FFN, K-FFN, and V-FFN. Additionally, in these or other embodiments, the video segmentation system 106 fixes other parameters of the cross-modal attention model as well as those of the other models (e.g., the text encoder, the frame encoder, etc.).

Further, in some embodiments, the video segmentation system 106 trains the cross-modal attention model in a preliminary training stage. In particular, in one or more implementations, the video segmentation system 106 modifies the parameters of the cross-modal attention model based on training data that includes short-form videos with labeled topic boundaries in the preliminary training stage. For example, in one or more embodiments, the video segmentation system 106 modifies parameters of layers of the cross-modal attention model as well as the parameters of the text encoder and the frame encoder in the preliminary training stage. In these or other embodiments, the video segmentation system 106 performs the preliminary training stage prior to modifying the parameters of the layers of the cross-modal attention model utilizing the contrastive losses (e.g., the intra-modal contrastive loss 504 and/or the cross-modal contrastive loss 508).

Moreover, in one or more implementations, the video segmentation system 106 trains the cross-modal attention model in a subsequent training stage. Specifically, in some embodiments, the video segmentation system 106 modifies the parameters of the cross-modal attention model based on training data that includes short-form videos with labeled topic boundaries in the subsequent training stage. For instance, in one or more implementations, the video segmentation system 106 modifies parameters of layers of the cross-modal attention model as well as the parameters of the text encoder and the frame encoder in the subsequent training stage. In these or other embodiments, the video segmentation system 106 performs the subsequent training stage after modifying the parameters of the layers of the cross-modal attention model utilizing the contrastive losses (e.g., the intra-modal contrastive loss 504 and/or the cross-modal contrastive loss 508).

Figure 6:
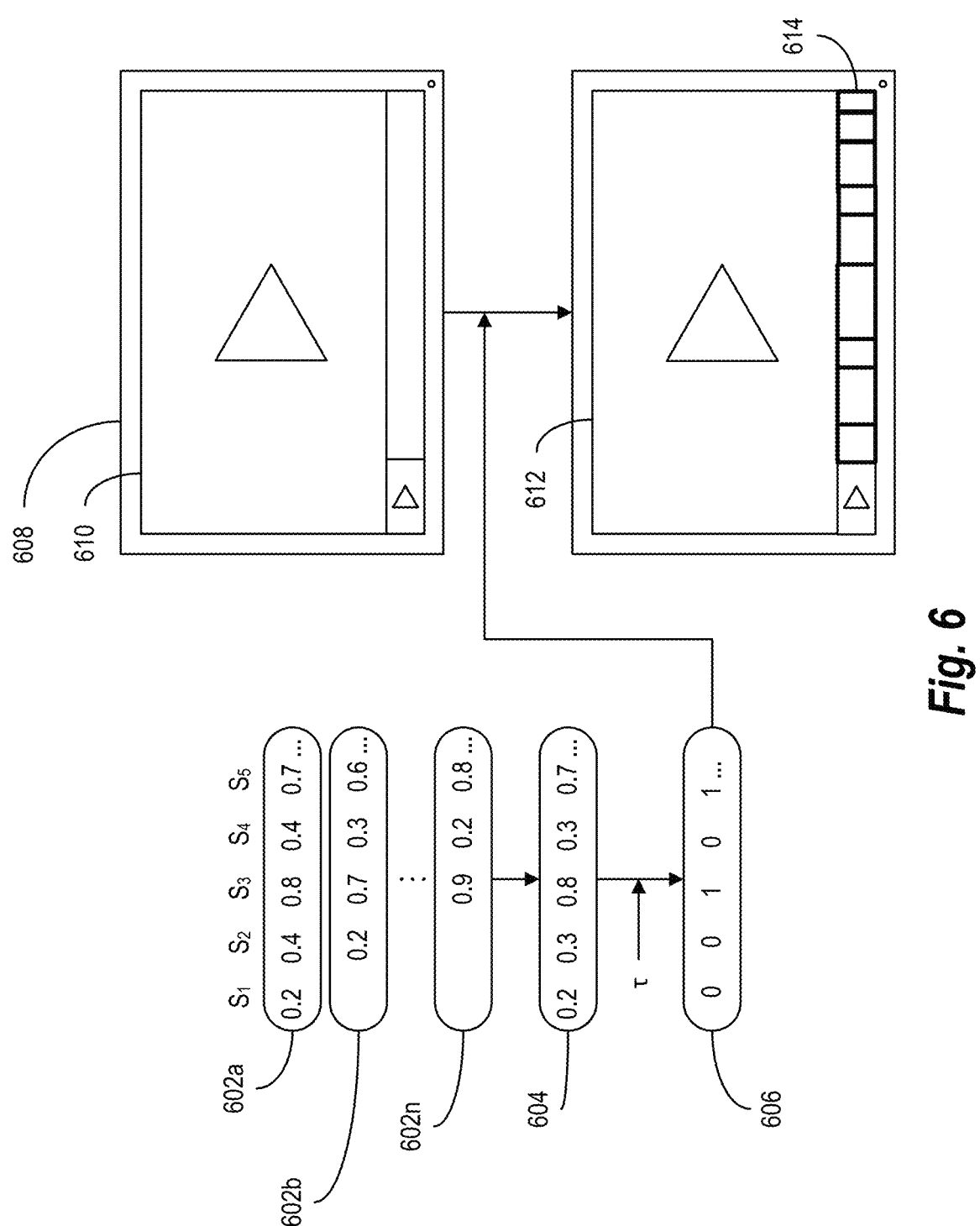
FIG. 6 illustrates a diagram of the video segmentation system determining topic chapters for a digital video and providing the topic chapters for display in accordance with one or more embodiments.

As noted previously, in one or more embodiments, the video segmentation system 106 determines a topic-boundary label for each transcript sentence. Furthermore, in one or more implementations, the video segmentation system 106 determines the topic chapters for a digital video based on the topic-boundary labels for the transcript sentences of the digital video. FIG. 6 illustrates a diagram of the video segmentation system determining topic chapters for a digital video and providing the topic chapters for display in accordance with one or more embodiments.

As depicted in FIG. 6, in some embodiments, the video segmentation system 106 generates a series of topic-boundary label predictions 602*a*-602*n* for the transcript sentences of a digital video. In particular, the video segmentation system 106 generates the topic-boundary label predictions 602*a*-602*n* for the transcript sentences as described above with respect to FIG. 4A. For example, the video segmentation system 106 generates the topic-boundary label predictions 602*a*-602*n* from individual video segments generated via a sliding window as described above.

To illustrate, in one or more implementations, the video segmentation system 106 generates the topic-boundary label predictions 602*a* from a first video segment. Specifically, the video segmentation system 106 generates the topic-boundary label predictions 602*a* indicating a likelihood that each transcript sentence of the first video segment represents a boundary between topics of the digital video (e.g., $s_1$ has a probability of 0.2, $s_2$ has a probability of 0.4, etc.) Similarly, in one or more embodiments, the video segmentation system 106 generates topic-boundary label predictions 602*b* for a second transcript sentence, and so forth through the nth transcript sentence. As shown, the video segmentation system 106 does not generate topic-boundary label predictions for some sentences of some video segments because the video segment does not include some transcript sentences. For instance, the topic-boundary label predictions 602*b* for the second video segment do not include a topic-boundary label prediction for $s_1$ because the second video segment does not include sentence $s_1$.

As further illustrated in FIG. 6, in one or more implementations, the video segmentation system 106 generates aggregated topic-boundary label predictions 604 for the transcript sentences. In particular, the video segmentation system 106 generates an aggregated topic-boundary label prediction for each transcript sentence based on the topic-boundary label predictions generated for each sentence. To illustrate, each of the video segments includes a topic-boundary label prediction for $s_5$. In these or other embodiments, the video segmentation system 106 generates an aggregated topic-boundary label prediction (e.g., with a value of 0.7) based on each topic-boundary label prediction for $s_5$ in the topic-boundary label predictions 602a-602n. Additionally, in some embodiments, the video segmentation system 106 generates the aggregated topic-boundary label predictions by determining an average (or other similar metric such as a median, etc.) of the topic-boundary label predictions generated for each transcript sentence according to an exemplary aggregation function:

$$\tilde{p}_m = \frac{1}{k}\sum_{i=1}^{k} p_{m}^{\mathbb{S}_i}$$

In the exemplary aggregation function, $\tilde{p}_m$ represents the average of the topic-boundary label predictions of a given sentence, k represents the number of overlapping video segments containing the sentence, and $p_{m}^{s_i}$ represents the individual topic-boundary label predictions for the sentence.

As also depicted in FIG. 6, in one or more implementations, the video segmentation system 106 generates topic-boundary label 606 for the sentences of the transcript of the digital video. Specifically, the video segmentation system 106 generates the topic-boundary label for a given transcript sentence based on the aggregated topic-boundary label predictions 604 (e.g., determined as averages, medians, etc.). Further, in one or more embodiments, the video segmentation system 106 compares the aggregated topic-boundary label predictions 604 with a topic-boundary threshold (e.g., represented symbolically as r) to generate binary topic-boundary labels 606 for the transcript sentences. In particular, in one or more implementations, the video segmentation system 106 assigns a 1 if the aggregate topic-boundary label prediction is greater than the topic-boundary threshold and a 0 if not. In these or other embodiments, 1 is a binary label which denotes that the corresponding sentence overlaps a video topic segment boundary, and 0 denotes otherwise. In one or more implementations, the video segmentation system 106 utilizes a 1 to denote the sentence borders an ending of a topic chapter. Alternatively, in some embodiments, the video segmentation system 106 utilizes a 1 to denote that the sentence borders a beginning of a topic chapter. Moreover, in one or more implementations, the video segmentation system 106 does not determine a topic-boundary label for the last (or, alternatively, first) sentence of the transcript, as the last sentence (or alternatively, the first sentence) is at the end of a topic segment by default, and therefore is assigned a 1 for a topic-boundary label.

FIG. 6 further shows a client device 608 displaying the digital video (e.g., a long-form video) via a graphical user interface 610. The video segmentation system 106 determines topic-boundary sentences from the digital video based on the topic-boundary labels 606. For example, the video segmentation system 106 determines topic-boundary sentences spoken in the digital video that are associated with a topic boundary of the digital video. Moreover, in some embodiments, the video segmentation system 106 determines topic chapters for the digital video by pairing the topic-boundary labels with time stamps of corresponding topic-boundary sentences of the video. Moreover, FIG. 6 shows the video segmentation system 106 providing, for display via the client device 608, an updated graphical user interface 612 with the digital video. In particular, the video segmentation system 106 provides topic chapters 614 for display with the digital video.

Figure 7:
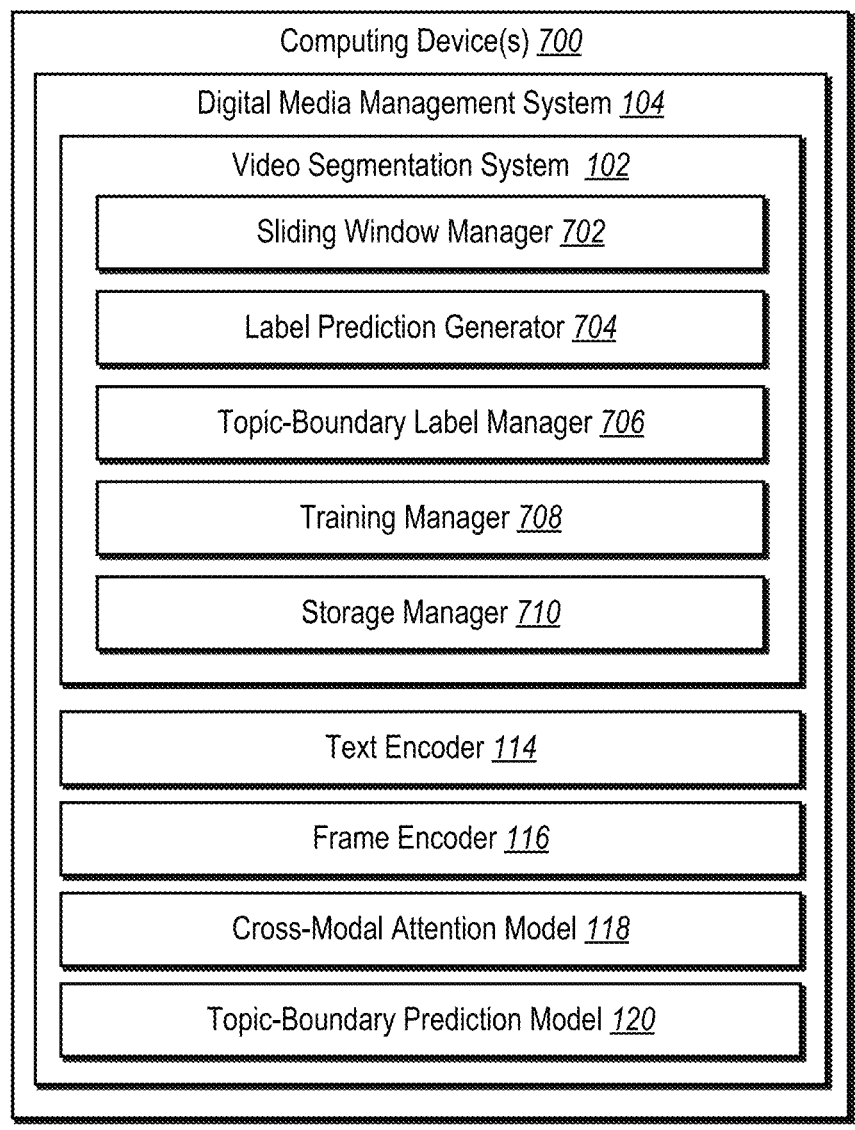
FIG. 7 illustrates an example schematic diagram of the video segmentation system in accordance with one or more embodiments.

In particular, FIG. 7 illustrates an example video segmentation system 106 executed by a computing device(s) 700 (e.g., the server device(s) 102 or the client device 108). As shown by the embodiment of FIG. 7, the computing device(s) 700 includes or hosts the digital media management system 104 and/or the video segmentation system 106. Furthermore, as shown in FIG. 7, the video segmentation system 106 includes a sliding window manager 702, a label prediction generator 704, a topic-boundary label manager 706, a training manager 708, and a storage manager 710.

As shown in FIG. 7, the video segmentation system 106 includes a sliding window manager 702. The sliding window manager 702 generates overlapping segments of a digital video. Specifically, the video segmentation system 106 utilizes a sliding window to divide the digital video into overlapping segments, each including a subset of sentences of a transcript of the video and video frames corresponding to the sentences. Furthermore, the sliding window manager 702 interacts with other components to pass the overlapping segments for further processing.

Additionally, as shown in FIG. 7, the video segmentation system 106 includes a label prediction generator 704. In one or more implementations, the label prediction generator 704 receives the overlapping segments of the digital video and video transcript and generates topic-boundary label predictions for the subset of sentences in each overlapping segment. In particular, in one or more embodiments, the label prediction generator 704 utilizes the text encoder 114 to generate text representations of the sentences and the frame encoder 116 to generate frame representations of the video frames. Further, in one or more implementations, the video segmentation system 106 utilizes the cross-modal attention model 118 to generate the topic-boundary label predictions for the sentences based on the text representations and the frame representations. Moreover, the label prediction generator 704 interacts with other components to pass the topic-boundary label predictions for further processing.

Moreover, as shown in FIG. 7, the video segmentation system 106 includes a topic-boundary label manager 706. In one or more implementations, the topic-boundary label manager 706 determines topic-boundary labels for transcript sentences. For instance, the topic-boundary label manager 706 receives the topic-boundary label predictions and generates a topic-boundary label for each sentence of the transcript based on the topic-boundary label predictions. Furthermore, in some embodiments, the topic-boundary label manager 706 determines topic-boundary sentences form the digital video based on the topic-boundary labels.

Additionally, as shown in FIG. 7, the video segmentation system 106 includes a training manager 708. The training manager modifies the parameters of layers of the cross-modal attention model 118. Specifically, in one or more implementations, the training manager 708 modifies the parameters utilizing one or more of a cross-modal contrastive loss and/or an intra-modal contrastive loss. For instance, in one or more embodiments, the training manager 708 receives the text representations and the frame representations from the label prediction generator 704 as part of the training data for modifying the parameters of the layers of the cross-modal attention model 118.

Further, as shown in FIG. 7, the video segmentation system 106 includes a storage manager 710. In one or more implementations, the storage manager 710 stores information (e.g., via one or more memory devices) on behalf of the video segmentation system 106. For example, the storage manager 710 includes a database for storing text representations, frame representations, topic-boundary label predictions and/or topic-boundary labels for transcript sentences.

Each of the components 702-710 of the video segmentation system 106 includes software, hardware, or both. For example, the components 702-710 include one or more instructions stored on a computer-readable storage medium and executable by processors of one or more computing devices, such as a client device or server device. When executed by the one or more processors, in one or more implementations, the computer-executable instructions of the video segmentation system 106 cause the computing device(s) to perform the methods described herein. Alternatively, in one or more implementations, the components 702-710 include hardware, such as a special purpose processing device to perform a certain function or group of functions. Alternatively, in one or more implementations, the components 702-710 of the video segmentation system 106 include a combination of computer-executable instructions and hardware.

Furthermore, the components 702-710 of the video segmentation system 106 are, for example, implemented as one or more operating systems, as one or more stand-alone applications, as one or more modules of an application, as one or more plug-ins, as one or more library functions, as one or more functions callable by other applications, and/or as a cloud-computing model. Thus, in one or more implementations, the components 702-710 are implemented as a stand-alone application, such as a desktop or mobile application. Furthermore, in various implementations, the components 702-710 are implemented as one or more web-based applications hosted on a remote server. In one or more implementations, the components 702-710 are implemented in a suite of mobile device applications or "apps." To illustrate, in one or more implementations, the components 702-710 are implemented in an application, including but not limited to ADOBE BEHANCE, ADOBE CREATIVE CLOUD, ADOBE PREMIERE, ADOBE PREMIERE RUSH, and ADOBE SENSEI. The foregoing are either registered trademarks or trademarks of Adobe in the United States and/or other countries.

FIGS. 1-7, the corresponding text, and the examples provide a number of different systems, methods, and non-transitory computer readable media for segmenting digital videos into topic chapters utilizing a sliding window and video segmentation machine learning models. In addition to the foregoing, embodiments can also be described in terms of flowcharts comprising acts for accomplishing a particular result. For example, FIGS. 8-10 illustrate flowcharts of example sequences of acts in accordance with one or more embodiments.

While FIGS. 8-10 illustrate acts according to some embodiments, alternative embodiments may omit, add to, reorder, and/or modify any of the acts shown in FIGS. 8-10. The acts of FIGS. 8-10 can be performed as part of a method. Alternatively, a non-transitory computer readable medium can comprise instructions, that when executed by one or more processors, cause a computing device to perform the acts of FIGS. 8-10. In still further embodiments, a system can perform the acts of FIGS. 8-10. Additionally, the acts described herein may be repeated or performed in parallel with one another or in parallel with different instances of the same or other similar acts.

FIG. 8 illustrates an example series of acts 800 for generating topic-boundary labels for transcript sentences of a digital video utilizing a sliding window and video segmentation machine learning models. The series of acts 800 can include an act 802 of utilizing a sliding window to divide a digital video into overlapping video segments; an act 804 of determining a subset of sentences of a transcript of the video for each video segment; an act 806 of determining a subset of video frames corresponding to each sentence of each segment; an act 808 of generating a plurality of topic-boundary label predictions for each sentence of each video segment; and an act 810 of generating a topic-boundary label for each sentence of the transcript based on the topic-boundary label predictions of the sentences of the video segments.

In some embodiments, the act 802 includes utilizing a sliding time window to divide a digital video into a plurality of overlapping segments, each segment of the plurality of overlapping segments including a subset of sentences of a transcript of the video and corresponding video frames for a given time window of the digital video. In some embodiments, the act 808 also includes an act of generating, for each segment of the plurality of overlapping segments, a plurality of topic-boundary label predictions for the subset of sentences by generating, utilizing a text encoder, text representations for the sentences of the subset of sentences. In one or more implementations, the act 808 further includes an act of generating, utilizing a frame encoder, a set of frame representations for the corresponding video frames. Additionally, in one or more embodiments, the act 808 includes an act of generating, utilizing a cross-modal attention model, a topic-boundary label prediction for each sentence in the segment based on the text representations and the set of frame representations. In one or more implementations, the act 810 also includes an act of generating a topic-boundary label for each sentence of the transcript based on the topic-boundary label predictions generated for the sentence.

In one or more implementations, utilizing the sliding window to divide the digital video into the plurality of overlapping segments includes generating the subsets of sentences to include one or more sentences not included in a previous overlapping segment. In one or more embodiments, utilizing the sliding window to divide the digital video into the plurality of overlapping segments includes utilizing a sliding window of a fixed length.

In one or more implementations, generating the topic-boundary label prediction for each sentence in the segment based on the text representations and the set of frame representations includes determining a text-aware visual representation for a sentence in a segment of the plurality of overlapping segments based on a text representation of the sentence and a set of frame representations corresponding to the sentence. In some embodiments, the series of acts 800 further includes an act of generating a topic-boundary label prediction for the sentence based on the text-aware visual representation.

In some embodiments, determining the text-aware visual representation for the sentence in the segment based on the text representation of the sentence and the set of frame representations corresponding to the sentence includes determining, for the sentence in the segment, a query vector from the text representation of the sentence. Additionally, in one or more implementations, the series of acts 800 includes an act of determining a key matrix from the set of frame representations corresponding to the sentence in the segment. In one or more embodiments, the series of acts 800 also includes an act of combining the query vector and the key matrix to generate the text-aware visual representation for the sentence in the segment.

In one or more implementations, generating the topic-boundary label prediction for the sentence based on the text-aware visual representation includes combining the text-aware visual representation and the text representation of the sentence. In one or more implementations, the series of acts 800 further includes an act of determining hidden states of the sentence from the combined text-aware visual representation and the text representation. Additionally, in some embodiments, the series of acts 800 includes an act of determining a binary prediction for the topic-boundary label prediction by comparing the hidden states with a topic-boundary threshold.

In one or more embodiments, generating the topic-boundary label for each sentence of the transcript based on the topic-boundary label predictions generated for the sentence includes determining an average of the topic-boundary label predictions generated for the sentence and comparing the average with a topic-boundary threshold.

FIG. 9 illustrates an example series of acts 900 for modifying parameters of a cross-modal attention model based on a cross-modal contrastive loss and/or an intra-modal contrastive loss. The series of acts 900 can include an act 902 of generating, utilizing a cross-modal attention model, topic-boundary label predictions for sentences of a digital video; an act 904 of modifying, based on the topic-boundary label predictions, parameters of one or more layers of the cross-modal attention model; an act 906 of modifying the parameters of the cross-modal attention model based on a cross-modal contrastive loss; and an act 908 of modifying the parameters of the cross-modal attention model based on an intra-modal contrastive loss.

In one or more implementations, the act 902 includes generating, utilizing a text encoder, a text representation for each of a plurality of transcript sentences of a transcript of a digital video. In one or more implementations, the act 902 also includes an act of generating, utilizing a frame encoder, a frame representation for each of a plurality of video frames of the digital video. In one or more embodiments, the act 902 further includes an act of generating, utilizing a cross-modal attention model, topic-boundary label predictions for one or more transcript sentences of the transcript based on the text representations of the plurality of transcript sentences and the frame representations of the plurality of video frames. Additionally, in one or more implementations, the act 904 includes an act of modifying, based on the topic-boundary label predictions, parameters of one or more layers of the cross-modal attention model utilizing one or more of a cross-modal contrastive loss or an intra-modal contrastive loss.

In some embodiments, the series of acts 900 includes modifying, in a preliminary training stage, the parameters of the cross-modal attention model based on training data including short-form videos with labeled topic boundaries prior to modifying the parameters of the one or more layers of the cross-modal attention model utilizing one or more of the cross-modal contrastive loss or the intra-modal contrastive loss.

In one or more implementations, the series of acts 900 includes modifying, in a subsequent training stage, the parameters of the cross-modal attention model based on training data including short-form videos with labeled topic boundaries after modifying the parameters of the one or more layers of the cross-modal attention model utilizing one or more of the cross-modal contrastive loss or the intra-modal contrastive loss.

In one or more embodiments, the series of acts 900 includes modifying the parameters of the one or more layers of the cross-modal attention model includes utilizing the intra-modal contrastive loss by minimizing a distance between frame representations corresponding to a first transcript sentence of the plurality of transcript sentences. In some embodiments, the series of acts 900 also includes an act of maximizing a distance between one or more frame representations corresponding to a second transcript sentence and one or frame representations corresponding to a third transcript sentence of the plurality of transcript sentences.

In one or more implementations, the series of acts 900 includes modifying the parameters of the one or more layers of the cross-modal attention model includes utilizing the cross-modal contrastive loss by minimizing a distance between a first text representation of a first transcript sentence of the plurality of transcript sentences and a first set of frame representations corresponding to the first transcript sentence. In one or more implementations, the series of acts 900 further includes an act of maximizing a distance between the first text representation and a second set of frame representations corresponding to a second transcript sentence.

In some embodiments, the series of acts 900 includes modifying the parameters of the one or more layers of the cross-modal attention model utilizing the cross-modal contrastive loss and the intra-modal contrastive loss.

In one or more implementations, the series of acts 900 includes modifying the parameters of one or more layers of the cross-modal attention model utilizing one or more of the cross-modal contrastive loss or the intra-modal contrastive loss without modifying parameters of the text encoder and the frame encoder.

FIG. 10 illustrates an example series of acts 1000 for determining topic-boundary sentences of a digital video. The series of acts 1000 can an act 1002 of generating text representations for sentences of a transcript of a digital video and frame representations for video frames of the digital video; an act 1004 of utilizing a sliding window to generate, from the digital video, overlapping video segments including subsets of transcript sentences and corresponding video frames; an act 1006 of generating topic-boundary labels for each sentence of a digital video based on the text representations and the frame representations; and an act 1008 of determining topic-boundary sentences from the digital video based on the topic-boundary labels.

In one or more embodiments, the act 1002 includes generating, utilizing a text encoder, text representations for sentences of a transcript of a digital video. Additionally, in one or more embodiments, the act 1002 includes an act of generating, utilizing a frame encoder, a set of frame representations for video frames of the digital video. In one or more implementations, the act 1006 also includes an act of generating, utilizing a cross-modal attention model with parameters generated utilizing an intra-modal contrastive loss and a cross-modal contrastive loss, a topic-boundary label for each sentence in the digital video based on the text representations and the set of frame representations. In some embodiments, the act 1008 further includes an act of determining topic-boundary sentences from the digital video based on the topic-boundary labels.

In one or more implementations, the series of acts 1000 includes utilizing a sliding window of a fixed length to divide the digital video into a plurality of overlapping segments, each segment of the plurality of overlapping segments including a subset of sentences of the transcript of the digital video and corresponding video frames for a given time window of the digital video.

In some embodiments, the series of acts 1000 includes generating the text representations for the sentences of the transcript of the digital video includes generating text representations for the sentences of the subset of sentences of each segment of the plurality of overlapping segments.

In one or more implementations, the series of acts 1000 includes generating, utilizing the cross-modal attention model with the parameters generated utilizing the intra-modal contrastive loss and the cross-modal contrastive loss, the topic-boundary label for each sentence in the digital video includes generating, utilizing the cross-modal attention model, a plurality of topic-boundary label predictions for a sentence of the transcript from a subset of segments of the plurality of overlapping segments, the subset of segments including the sentence. Additionally, in one or more implementations, the series of acts 1000 includes an act of generating a topic-boundary label for the sentence of the transcript based on the plurality of topic-boundary label predictions generated for the sentence in each overlapping segment.

In one or more embodiments, the series of acts 1000 includes generating, utilizing the cross-modal attention model, the plurality of topic-boundary label predictions for the sentence of the transcript includes determining, for the sentence in a segment of the plurality of overlapping segments, a query vector from a text representation of the sentence. In one or more embodiments, the series of acts 1000 also includes an act of determining a key matrix from a set of frame representations corresponding to the sentence in the segment. In one or more implementations, the series of acts 1000 further includes an act of combining the query vector and the key matrix to generate a text-aware visual representation for the sentence in the segment.

In one or more implementations, the series of acts 1000 includes combining the text-aware visual representation and the text representation of the sentence. Additionally, in some embodiments, the series of acts 1000 includes an act of determining hidden states of the sentence from the combined text-aware visual representation and the text representation. In one or more implementations, the series of acts 1000 also includes an act of determining a binary prediction for a topic-boundary label prediction of the sentence by comparing the hidden states with a topic-boundary threshold.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media. Non-transitory computer-readable storage media (devices) includes optical and/or non-optical memory, disks, or caches that store computer data interpretable by one or more processors to execute particular functions as described herein. A "network" is defined as one or more data links that enable the transport of electronic data between computer systems and/or modules and/or other electronic devices. Information is transferred or provided over a network (either hardwired, wireless, or a combination of hardwired or wireless) to a computer to carry program code in the form of computer-executable instructions or data structures and which can be accessed by a general purpose or special purpose computer.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Embodiments of the present disclosure can also be implemented in cloud computing environments. In this description, "cloud computing" is defined as a model for enabling on-demand network access to a shared pool of configurable computing resources. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth.

Figure 11:
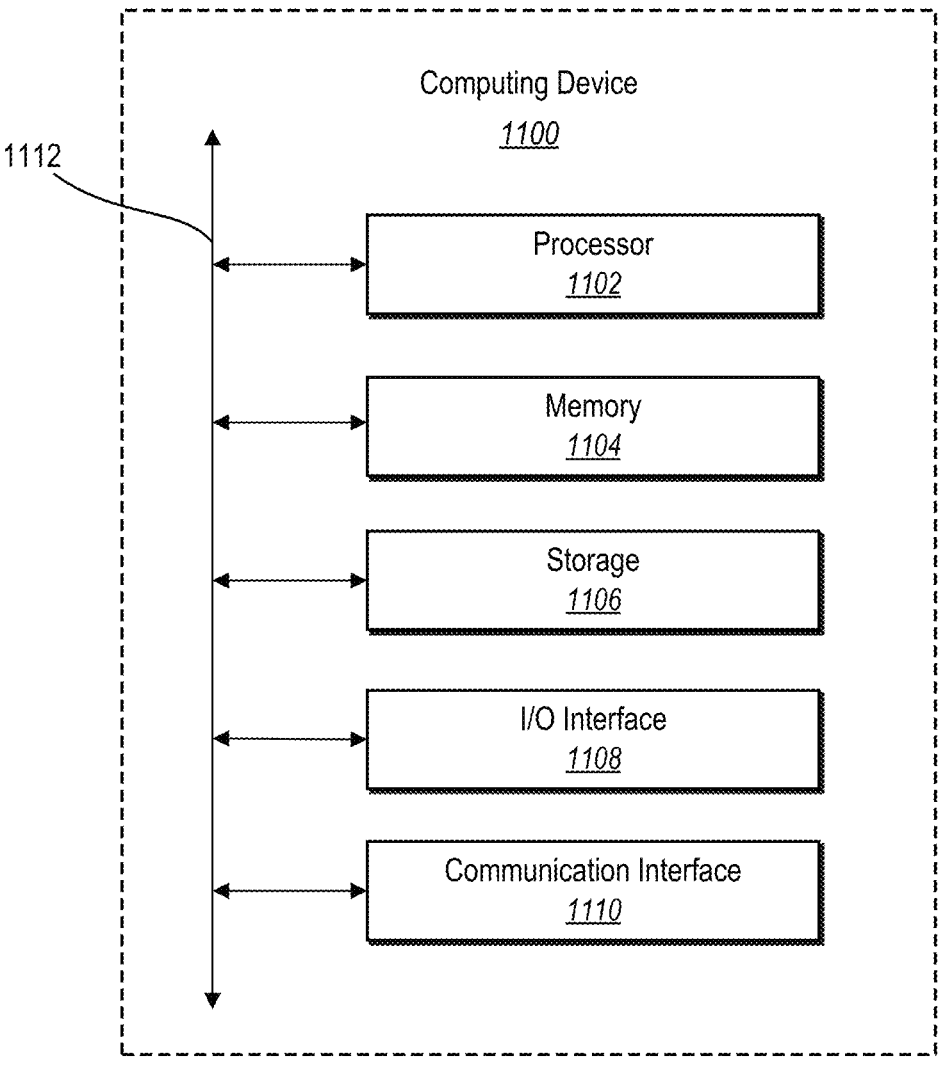
FIG. 11 illustrates a block diagram of an example computing device for implementing one or more embodiments of the present disclosure.

FIG. 11 illustrates, in block diagram form, an example computing device 1100 (e.g., the computing device 700, the client device 108, and/or the server device(s) 102) that may be configured to perform one or more of the processes described above. As shown by FIG. 11, the computing device can comprise a processor(s) 1102, memory 1104, a storage device 1106, an I/O interface 1108, and a communication interface 1110.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them. The computing device 1100 includes memory 1104, which is coupled to the processor(s) 1102. The memory 1104 may be used for storing data, metadata, and programs for execution by the processor(s). The memory 1104 may include one or more of volatile and non-volatile memories. The memory 1104 may be internal or distributed memory. The computing device 1100 includes a storage device 1106 includes storage for storing data or instructions. As an example, and not by way of limitation, storage device 1106 can comprise a non-transitory storage medium described above. The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices (e.g., computing device 1100) or one or more networks. The computing device 1100 can further include a bus 1112. The bus 1112 can comprise hardware, software, or both that couples components of computing device 1100 to each other.

What is claimed is:

1. A computer-implemented method comprising:
utilizing a sliding window to divide a digital video into a plurality of overlapping segments, each segment of the plurality of overlapping segments comprising a subset of sentences of a transcript of the digital video and corresponding video frames for a given sliding window of the digital video;
generating, for each segment of the plurality of overlapping segments, a plurality of topic-boundary label predictions for the subset of sentences by:
generating, utilizing a text encoder, text representations for sentences of the subset of sentences;
generating, utilizing a frame encoder, a set of frame representations for the corresponding video frames; and
generating, utilizing a cross-modal attention model, a topic-boundary label prediction for each sentence in the segment based on the text representations and the set of frame representations; and
generating a topic-boundary label for each sentence of the transcript based on the topic-boundary label predictions.

2. The computer-implemented method of claim 1, wherein utilizing the sliding window to divide the digital video into the plurality of overlapping segments comprises generating the subset of sentences to include one or more sentences not included in a previous overlapping segment.

3. The computer-implemented method of claim 2, wherein utilizing the sliding window to divide the digital video into the plurality of overlapping segments comprises utilizing a sliding window of a fixed length.

4. The computer-implemented method of claim 1, wherein generating the topic-boundary label prediction for each sentence in the segment based on the text representations and the set of frame representations comprises:
determining a text-aware visual representation for a sentence in a segment of the plurality of overlapping segments based on a text representation of the sentence and a set of frame representations corresponding to the sentence; and
generating a topic-boundary label prediction for the sentence based on the text-aware visual representation.

5. The computer-implemented method of claim 4, wherein determining the text-aware visual representation for the sentence in the segment based on the text representation of the sentence and the set of frame representations corresponding to the sentence comprises:
determining, for the sentence in the segment, a query vector from the text representation of the sentence;

determining a key matrix from the set of frame representations corresponding to the sentence in the segment; and
combining the query vector and the key matrix to generate the text-aware visual representation for the sentence in the segment.

6. The computer-implemented method of claim 4, wherein generating the topic-boundary label prediction for the sentence based on the text-aware visual representation comprises:
combining the text-aware visual representation and the text representation of the sentence;
determining hidden states of the sentence from the combined text-aware visual representation and the text representation; and
determining a binary prediction for the topic-boundary label prediction by comparing the hidden states with a topic-boundary threshold.

7. The computer-implemented method of claim 1, wherein generating the topic-boundary label for each sentence of the transcript based on the topic-boundary label predictions generated for the sentence comprises determining an average of the topic-boundary label predictions generated for the sentence and comparing the average with a topic-boundary threshold.

8. A system comprising:
one or more memory devices; and
one or more processors configured to cause the system to:
generate, utilizing a text encoder, a text representation for each of a plurality of transcript sentences of a transcript of a digital video;
generate, utilizing a frame encoder, a frame representation for each of a plurality of video frames of the digital video;
generate, utilizing a cross-modal attention model, topic-boundary label predictions for one or more transcript sentences of the transcript based on the text representations of the plurality of transcript sentences and the frame representations of the plurality of video frames; and
modify, based on the topic-boundary label predictions, parameters of one or more layers of the cross-modal attention model utilizing one or more of a cross-modal contrastive loss or an intra-modal contrastive loss.

9. The system of claim 8, wherein the one or more processors are further configured to modify, in a preliminary training stage, the parameters of the cross-modal attention model based on training data comprising short-form videos with labeled topic boundaries prior to modifying the parameters of the one or more layers of the cross-modal attention model utilizing one or more of the cross-modal contrastive loss or the intra-modal contrastive loss.

10. The system of claim 8, wherein the one or more processors are further configured to modify, in a subsequent training stage, the parameters of the cross-modal attention model based on training data comprising short-form videos with labeled topic boundaries after modifying the parameters of the one or more layers of the cross-modal attention model utilizing one or more of the cross-modal contrastive loss or the intra-modal contrastive loss.

11. The system of claim 8, wherein the one or more processors are further configured to modify the parameters of the one or more layers of the cross-modal attention model comprises utilizing the intra-modal contrastive loss by:
minimizing a distance between frame representations corresponding to a first transcript sentence of the plurality of transcript sentences; and maximizing a distance between one or more frame representations corresponding to a second transcript sentence and one or frame representations corresponding to a third transcript sentence of the plurality of transcript sentences.

12. The system of claim 8, wherein the one or more processors are further configured to modify the parameters of the one or more layers of the cross-modal attention model comprises utilizing the cross-modal contrastive loss by:

minimizing a distance between a first text representation of a first transcript sentence of the plurality of transcript sentences and a first set of frame representations corresponding to the first transcript sentence; and maximizing a distance between the first text representation and a second set of frame representations corresponding to a second transcript sentence.

13. The system of claim 8, wherein the one or more processors are further configured to modify the parameters of the one or more layers of the cross-modal attention model utilizing the cross-modal contrastive loss and the intra-modal contrastive loss.

14. The system of claim 8, wherein the one or more processors are further configured to modify the parameters of one or more layers of the cross-modal attention model utilizing one or more of the cross-modal contrastive loss or the intra-modal contrastive loss without modifying parameters of the text encoder and the frame encoder.

15. A non-transitory computer-readable medium storing executable instructions that, when executed by a processing device, cause the processing device to perform operations comprising:

generating, utilizing a text encoder, text representations for sentences of a transcript of a digital video;

generating, utilizing a frame encoder, a set of frame representations for video frames of the digital video;

generating, utilizing a cross-modal attention model with parameters generated utilizing an intra-modal contrastive loss and a cross-modal contrastive loss, a topic-boundary label for each sentence in the digital video based on the text representations and the set of frame representations; and determining topic-boundary sentences from the digital video based on the topic-boundary labels.

16. The non-transitory computer-readable medium of claim 15, wherein the operations further comprise:

utilizing a sliding window of a fixed length to divide the digital video into a plurality of overlapping segments, each segment of the plurality of overlapping segments comprising a subset of sentences of the transcript of the digital video and corresponding video frames for a given sliding window of the digital video.

17. The non-transitory computer-readable medium of claim 16, wherein generating the text representations for the sentences of the transcript of the digital video comprises generating text representations for the sentences of the subset of sentences of each segment of the plurality of overlapping segments.

18. The non-transitory computer-readable medium of claim 17, wherein generating, utilizing the cross-modal attention model with the parameters generated utilizing the intra-modal contrastive loss and the cross-modal contrastive loss, the topic-boundary label for each sentence in the digital video comprises:

generating, utilizing the cross-modal attention model, a plurality of topic-boundary label predictions for a sentence of the transcript from a subset of segments of the plurality of overlapping segments, the subset of segments comprising the sentence; and generating a topic-boundary label for the sentence of the transcript based on the plurality of topic-boundary label predictions generated for the sentence in each overlapping segment.

19. The non-transitory computer-readable medium of claim 18, wherein generating, utilizing the cross-modal attention model, the plurality of topic-boundary label predictions for the sentence of the transcript comprises:

determining, for the sentence in a segment of the plurality of overlapping segments, a query vector from a text representation of the sentence;

determining a key matrix from a set of frame representations corresponding to the sentence in the segment; and combining the query vector and the key matrix to generate a text-aware visual representation for the sentence in the segment.

20. The non-transitory computer-readable medium of claim 19, further comprising:

combining the text-aware visual representation and the text representation of the sentence;

determining hidden states of the sentence from the combined text-aware visual representation and the text representation; and determining a binary prediction for a topic-boundary label prediction of the sentence by comparing the hidden states with a topic-boundary threshold.

\* \* \* \* \*